United States Patent
Natanzon

(10) Patent No.: US 11,327,680 B2
(45) Date of Patent: *May 10, 2022

(54) SERVERLESS SOLUTION FOR CONTINUOUS DATA PROTECTION

(71) Applicant: EMC IP Holding Company LLC, Hopkinton, MA (US)

(72) Inventor: Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 89 days.

This patent is subject to a terminal disclaimer.

(21) Appl. No.: 16/868,774

(22) Filed: May 7, 2020

(65) Prior Publication Data

US 2020/0264775 A1 Aug. 20, 2020

Related U.S. Application Data

(63) Continuation of application No. 15/965,620, filed on Apr. 27, 2018, now Pat. No. 10,684,790.

(51) Int. Cl.
| | |
|---|---|
| *G06F 11/00* | (2006.01) |
| *G06F 3/06* | (2006.01) |
| *G06F 21/60* | (2013.01) |
| *G06F 16/901* | (2019.01) |
| *G06F 11/14* | (2006.01) |

(52) U.S. Cl.
CPC ............ *G06F 3/065* (2013.01); *G06F 3/064* (2013.01); *G06F 3/067* (2013.01); *G06F 3/0619* (2013.01); *G06F 3/0644* (2013.01); *G06F 11/1446* (2013.01); *G06F 11/1458* (2013.01); *G06F 11/1461* (2013.01); *G06F 11/1469* (2013.01); *G06F 16/901* (2019.01); *G06F 21/60* (2013.01)

(58) Field of Classification Search
CPC ............ G06F 11/1446; G06F 11/1448; G06F 11/1451; G06F 11/1456; G06F 11/1458; G06F 11/1461; G06F 11/1464; G06F 11/1466; G06F 11/1469; G06F 21/60; G06F 16/901
See application file for complete search history.

(56) References Cited

U.S. PATENT DOCUMENTS

2013/0103650 A1* 4/2013 Natanzon ............ G06F 11/2069 707/684
2018/0196867 A1* 7/2018 Wiesmaier ............ G06F 16/285

* cited by examiner

*Primary Examiner* — Reginald G Bragdon
*Assistant Examiner* — Michael L Westbrook
(74) *Attorney, Agent, or Firm* — Staniford Tomita LLP

(57) ABSTRACT

A serverless application is provided to a cloud site of a cloud services provider. The cloud services provider offers backend services that include an object store and a database. Input/output (IO) writes sent to a volume of a block storage device at a production site are intercepted and aggregated. The aggregated IOs and metadata for the IOs are transmitted from the production site to the cloud site of the cloud services provider. Upon receipt of the aggregated IOs and metadata at the cloud site, the aggregated IOs are stored in an object in the object store at the cloud site, and a function of the serverless application is triggered to write the metadata to the database offered by the cloud services provider.

15 Claims, 17 Drawing Sheets

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |

| 11 | 12 | 13 | 14 | 15 | 16 | 17 | 18 | 19 |

FIG. 16

SERVERLESS SOLUTION FOR CONTINUOUS DATA PROTECTION

CROSS-REFERENCE TO RELATED APPLICATIONS

This patent application is a continuation of U.S. patent application Ser. No. 15/965,620, filed Apr. 27, 2018, which is incorporated by reference along with all other references cited in this application.

TECHNICAL FIELD

The present invention relates generally to information processing systems, and more particularly to the protection of data.

BACKGROUND

Computer data is vital to organizations. A significant part of protection against disasters is focused on data protection. Continuous Data Protection (CDP) refers to a data protection technique in which data in an organization is backed up whenever any change is made.

In some cases, an organization may use the services provided by a cloud services provider for CDP. The cloud storage provider may charge based on usage of resources such as amount of storage used, type of storage used, compute, and so forth. Conventional CDP techniques require a significant amount of resources, expensive block devices, and compute. There remains a continuing desire to reduce costs and increase efficiency.

Therefore, there is a need for improved systems and techniques for efficient and cost-effective data protection.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 9 shows a block diagram of a layout of a volume at time T0, according to one or more embodiments.

FIG. 10 shows a block diagram of a layout of the volume at time T1, according to one or more embodiments.

FIG. 11 shows a block diagram of a layout of the volume at time T2, according to one or more embodiments.

FIG. 12 shows a block diagram of a layout of the volume at time T3, according to one or more embodiments.

FIG. 13 shows a block diagram of a layout of the volume at time T4, according to one or more embodiments.

FIG. 14 shows a block diagram of a layout of the volume at time T5, according to one or more embodiments.

FIG. 16 shows an example of data being returned responsive to the read request, according to one or more embodiments.

DETAILED DESCRIPTION

Figure 1:
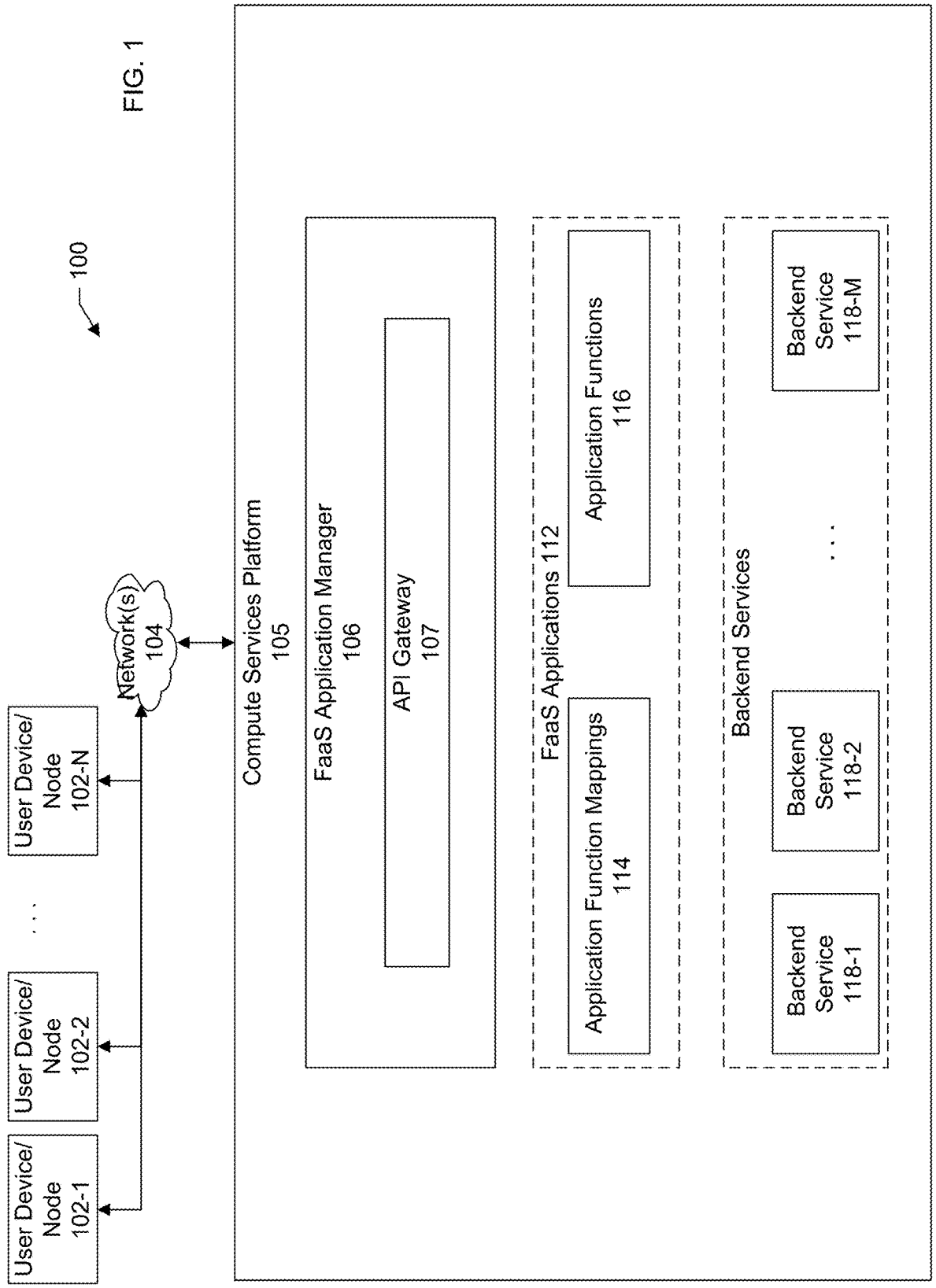
FIG. 1 shows a block diagram of an information processing system comprising a cloud-based compute services platform configured for serverless or function-as-a-service (FaaS)-based CDP, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for continuous data protection (CDP) using a serverless or function-as-a-service ("FaaS") application that stores protected data in object storage. Continuous data protection can be used for disaster recovery and protection against corruption. Continuous data protection can involve keeping a full copy of the data in the cloud in a production volume, and updating the volume with new data as the new data arrives. This technique, however, requires a significant amount of resources, expensive block devices (e.g., about three times more than object storage) and compute devices.

In a specific embodiment, novel methods and systems are provided for continuous data protection. In this specific embodiment, data protection is implemented using FaaS, when protecting the data, and virtual machines may be spun up or started only when performing a full recovery of a virtual machine in the cloud. In an embodiment, the solution provides access to the volume using function-as-a-service as well. Though the speeds at which access is provided may be low as compared to a block device, the speeds are sufficiently fast for typical use cases of single file recovery.

In a specific embodiment, new systems and techniques are provided which leverage function-as-a-service and allow the user to pay only for object storage and a database, while the cost of compute is minor and is applied only when data arrives to the cloud. The systems and techniques disclosed herein allow reading data from a point in time of any volume as a service, and thus recovery of small files from multiple points can be relatively fast and very inexpensive.

Continuous data protection is a method for disaster recovery and data protection which allows any point in time recovery. In an embodiment, a continuous remote data protection system intercepts every IO written to a block device using a splitter filter driver on the production site. There can be an appliance at the replica site (and in many cases also at the production site). IOs may be intercepted by the splitter filter driver and sent over a wide area network ("WAN") to the remote site when they are written into a journal and also into a remote copy of the volume. With CDP, the user can restore to any point in time, and recover data before a failure event. CDP systems can be used both for corruption recovery and for disaster recover ("DR").

Having, however, an appliance and a full copy of the data in a block device and having a live virtual machine in the cloud accepting the IOs is expensive. Object storage, however, is relatively much less expensive than block storage. Compute is also relatively expensive and can be inefficient, especially for users with virtual machines that make a relatively small amount or number of IO operations. The standard CDP approach also allows fast access to the latest point in time and slower access to older points in time, or requires management of snapshots which have an even higher cost in a cloud-based compute system as compared to block storage.

FIG. 1 shows an information processing system 100 configured in accordance with an illustrative embodiment. The information processing system includes user devices 102-1, 102-2, . . . 102-N. The user devices 102 communicate over a network 104 with a compute services platform 105.

The user devices can include, for example, desktop, laptop or tablet computers, mobile telephones, smartphones, portable communication devices, or other types of processing devices capable of communicating with the compute services platform 105 over the network 104. The variable N and other similar index variables herein such as M are assumed to be arbitrary positive integers greater than or equal to two.

The term "user" herein is intended to be broadly construed so as to encompass numerous arrangements of human, hardware, software or firmware entities, as well as combinations of such entities. Thus, a user device may be referred to as a host or node and may include a server computer. Compute services are assumed to be provided for users under a Function-as-a-Service (FaaS) model, although it is to be appreciated that other types of cloud infrastructure arrangements could be used. For example, at least a portion of the available compute services in some embodiments may additionally or alternatively be provided under a Platform-as-a-Service (PaaS) model.

The compute services platform 105 in the present embodiment is therefore assumed to implement at least a portion of a FaaS environment accessible to the user devices 102 over the network 104.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The compute services platform 105 implements compute services on behalf of respective cloud infrastructure tenants each corresponding to one or more users associated with respective ones of the user devices 102. By way of example, the compute services are assumed to include execution of one or more serverless applications on behalf of each of one or more users associated with respective user devices 102, although it should be understood that illustrative embodiments are not limited to serverless applications, but are more generally applicable to any applications that execute at least in part within a FaaS environment.

The compute services platform 105 in some embodiments may be implemented as part of a cloud infrastructure in the form of a cloud-based system such as an Amazon Web Services (AWS) system. Other examples of cloud-based systems that can be used to provide at least portions of the compute services platform 105 and possibly other portions of system 100 include Google Cloud Platform (GCP) and Microsoft Azure.

As a more particular example, the compute services platform 105 in some embodiments may be configured to implement a serverless application architecture similar to the AWS Lambda serverless application architecture, as described in reference documents of Amazon Web Services, Inc. entitled "AWS Lambda: Developer Guide," 2017, and "AWS Serverless Multi-Tier Architectures, Using Amazon API Gateway and AWS Lambda," November 2015, both of which are incorporated by reference herein along with all other references cited.

These and other serverless application architectures referred to herein allow users to build and run applications without the need to provision, maintain or otherwise manage any servers. Although a given compute services platform implementing such an architecture may include servers, the applications are referred to as "serverless" in that the applications can be run and scaled without user reference to any particular server or servers and the user is therefore relieved of any server-related issues. The term "serverless" should therefore not be construed as indicating that a compute services platform or other processing platform that executes a given serverless application cannot include any servers. Advantages of serverless application architectures include scalability and reduced operational costs as well as finely-grained metering of compute services actually utilized by platform users.

Again, references herein to serverless applications are intended as examples of applications that may be executed in a FaaS environment. Other types of applications can be executed in a FaaS environment in other embodiments. A serverless architecture refers to applications that are packaged as stateless ephemeral containers that respond to external events and interact with backend services. Serverless architectures are becoming extremely popular because they can reduce an organization's or enterprise's operational cost (e.g., pay only when executing) and can be easily scaled. One example of a cloud vendor host that offers a platform for such applications is Amazon via AWS Lambda. Examples of other cloud vendors providing platforms for serverless applications and functions include Google and Microsoft.

A serverless or FaaS application 112 includes three types of artifacts that are required for it to operate in production: (1) backend services 118, (2) application functions 116, and (3) application function mappings 114. Backend services refer to databases, object stores, persisted messaging services, or other type of service that can store long term state for the application. Examples of backend services include AWS S3, DynamoDB, Aurora, or an Oracle database, among others.

Application functions refer to a set of stateless functions packaged as containers that will be invoked according to the application's function mappings. The application functions can interact with the backend services to read and store state. An example of an application function includes a script that reads a photo from an S3 logical storage bucket and creates a thumbnail for it.

Application function mappings specify the conditions under which the application functions are invoked. More particularly, a serverless application requires set of conditions that instruct the platform to activate the application functions. Examples include reactions to events or operations of backend services (e.g., object uploaded to an S3 bucket, object deleted from an S3 bucket, transaction committed on a relational database, message has been sent to a queue or assigned uniform resource locator (URL) endpoint (e.g., when a post request arrives at my-app-dns/my-app-api/data)). Conditions could be simple or include more complex filters. In addition, application functions can directly invoke other functions (downstream functions).

In a specific embodiment, a FaaS application is configured to implement a continuous data protection solution for a particular business, enterprise, or other organization. It should be appreciated that the compute services platform 105 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The FaaS application manager 106 of the compute services platform 105 is configured to receive a request to execute one of the FaaS applications 112 and to initiate execution of the FaaS application responsive to the request. The request initiating execution of the FaaS application is received in the API gateway 107 of the compute services platform 105 from one of the user devices 102 over network 104. The request to initiate execution of the FaaS application can also be triggered by particular events, such as the creation of an object in an object store bucket, an operation on a database (e.g., insertion of an entry), URL access, and many other different types of events. As noted above, the FaaS applications in some cases include serverless applications executed by the compute services platform 105 in accordance with a FaaS model.

A given one of the FaaS applications 112 executed in the compute services platform 105 under the control of the FaaS application manager 106 illustratively comprises one or more of the application function mappings 114, one or more of the application functions 116, and utilizes one or more of the backend services 118.

Accordingly, the FaaS application manager 106 utilizes one or more of the application function mappings 114 to invoke one or more of the application functions 116 with each such application function interacting with one or more of the backend services 118 in executing the FaaS application.

The application function mappings 114 each specify one or more conditions under which particular ones of the application functions 116 are invoked. For example, the conditions specified by the application function mappings 114 may comprise respective events each relating to one or more of the backend services 118.

These and other conditions instruct the compute services platform 105 to activate the corresponding instances of the application functions 116. As discussed, examples of conditions that may be part of one or more of the application function mappings 114 include an object being uploaded to an AWS S3 bucket, a transaction being committed on a relational database, and a message being sent to a queue. Other example conditions relate to events associated with designated URL endpoints. For example, one possible condition can be an event defined as a POST request arriving at a URL endpoint denoted my-app-dns/my-app-api/data. These and other conditions of this type not only indicate when to execute the application functions, but also map particular endpoints to certain application functions. The various conditions that may be specified by the application function mappings 114 can include simple conditions as well as more complex conditions each based on filtering of multiple simpler conditions.

The application functions 116 are each assumed to execute in one or more stateless ephemeral containers of the compute services platform 105. Such containers can include the above-noted Docker containers or other types of LXCs. The containers are illustratively configured to respond to external events and to interact with backend services 118. The application functions 116 more particularly comprise stateless functions packaged as containers that will be invoked according to the conditions specified in one or more of the application function mappings 114. The application functions 116 can interact with one or more of the backend services 118 to read and store data using those backend services. For example, a given one of the application functions 116 can comprise a Python script that reads an image from an AWS S3 object store and creates a thumbnail for it.

The backend services 118 illustratively comprise at least one of a database service, an object storage service and a message processing service, although a wide variety of additional or alternative services can be supported in the compute services platform 105. More particular examples of backend services 118 include AWS S3, GCP Cloud Storage, Microsoft Azure Blob Storage, DynamoDB, MongoDB, Amazon Aurora and Oracle database. Although the backend services 118 in the present embodiment are shown as part of the compute services platform 105, at least a subset of these backend services in other embodiments may be implemented on one or more other processing platforms that are accessible to the compute services platform 105 over one or more networks.

Figure 2:
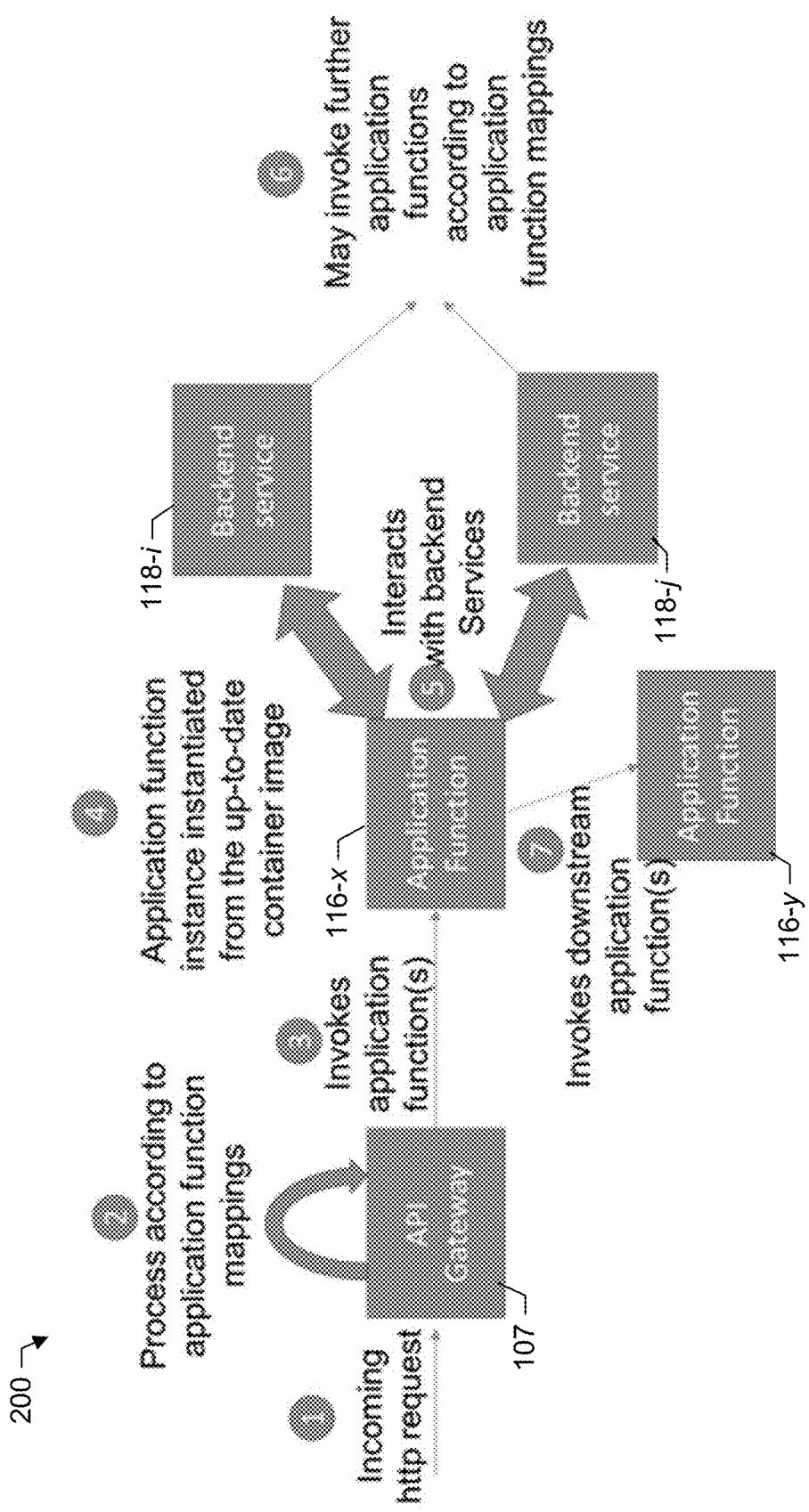
FIG. 2 shows a block diagram showing interactions between application function mappings, application functions, and backend services in a cloud-based compute services platform, according to one or more embodiments.

FIG. 2 illustrates example interactions 200 between particular ones of the application function mappings 114, application functions 116 and backend services 118 of compute services platform 105. These example interactions 200 are assumed to occur in conjunction with the execution of a given one of the FaaS applications 112 under the control of the FaaS application manager 106. The given FaaS application is also referred to in this context and other contexts herein as simply an "application."

The interactions 200 shown in FIG. 2 are arranged in multiple steps denoted as steps 1-7, and involve API gateway 107, a particular application function 116-x, another particular application function 116-y, and particular backend services 118-i and 118-j.

In a step 1, an incoming request to initiate execution of the application is received in the API gateway 107 of the FaaS application manager 106. The request in this embodiment more particularly comprises a Hypertext Transfer Protocol ("HTTP") request received in the compute services platform 105 over the network 104 from one of the user devices 102.

In a step 2, the incoming request is processed by the FaaS application manager 106 using one or more of the application function mappings 114 that are determined to be associated with the request.

In a step 3, the API gateway 107 based on the processing in accordance with the one or more of the application function mappings 114 invokes one or more of the application functions 116. This illustratively includes at least application function 116-x, and may include additional application functions (e.g., application function 116-y).

In a step 4, an instance of the application function 116-x is instantiated by the FaaS application manager 106 using a corresponding up-to-date container image.

In a step 5, the instantiated application function 116-x interacts with multiple backend services including the backend services 118-i and 118-j.

In a step 6, each of the backend services 118-i and 118-j may invoke one or more additional ones of the application functions 116 in accordance with the particular application being executed.

In a step 7, an application function (e.g., application function 116-x) may invoke another or downstream application function (e.g., application function 116-y).

It is to be appreciated that these particular process steps, interactions and other features and functionality illustrated in the embodiment of FIG. 2 are presented by way of example only and can be varied in other embodiments.

Figure 3:
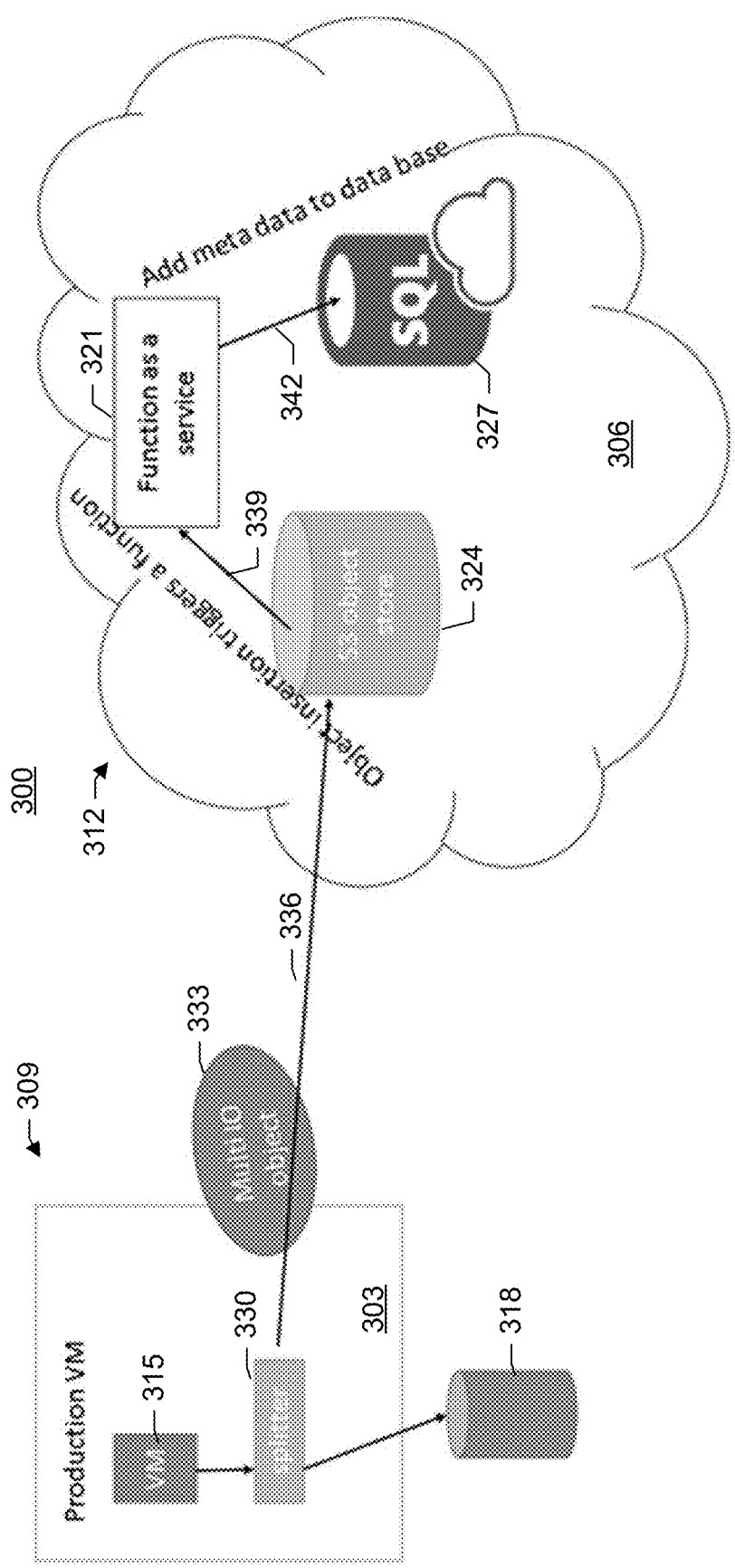
FIG. 3 shows a block diagram of a CDP FaaS-based system, according to one or more embodiments.

FIG. 3 shows a block diagram illustrating a continuous data protection system 300 utilizing a serverless or FaaS architecture. As shown in the example of FIG. 3, there is a production site 303 and a replica site 306. The production site may include a storage area network (SAN) that provides access to consolidated block level data storage.

More particularly, the production site includes a user device or node 309 that is connected via a network to a cloud-based compute services platform 312. The cloud-based compute services platform may be as shown in FIG. 1 and described in the discussion accompanying FIG. 1.

The user device may include a host computer that hosts a virtual machine 315 (e.g., production VM) that writes to a volume 318. The compute services platform serves as the replica site and includes a function-as-a-service (FaaS) CDP application 321, an object store 324, and a database 327 (e.g., SQL database).

In a specific embodiment, the object store is an AWS S3 object store having buckets that store objects. A bucket refers to a logical unit of storage. Each object may include data, a key or identifier, and object metadata. The object key (or key name) uniquely identifies the object in a bucket.

Object metadata is a set of name-value pairs. Object metadata may be set at the time the object is uploaded into the bucket. Generally, after the object has been uploaded, the object metadata cannot be modified. Examples of object metadata include object creation date and object size.

Under normal operation, the production site is the source-side of the system and the replica site is the target-side of the system. The replica site is responsible for replicating production site data. Additionally, the replica site enables rollback of production site data to earlier points in time, which may be used in the event of data corruption of a disaster or to view or to access data from an earlier point in time. In an embodiment, the production and replica sites are remote from each other. In another embodiment, the sites may both be located at a common site, local to one another. Local data protection has the advantage of minimizing data lag between the target and source, and remote data protection has the advantage of being available in the event a disaster occurs at the source side.

The host or VM runs a data processing application such as a database application or an email server and issues input/output (IO) requests (e.g., write/read operations) to the volume. The volume may be a virtual machine volume or any other type of volume. The volume may be associated with a storage array having a set of block devices for storage. A block device is a piece of hardware that can be used to store data. Examples of block devices include traditional spinning hard disk drives (HDDs) and solid state drives (SSDs). These components are referred to as block devices because the OS kernel interfaces with the hardware by referencing fixed-size blocks, or chunks of space. For example, IOs are generally transmitted to the volume with an address that includes the volume, an offset within the volume, and a data size. Thus, a write IO of 10 kilobytes (KB), for example, would have write size of 20 blocks in a volume with a 512-byte block size alignment.

In a specific embodiment, there is a splitter 330. The splitter may be implemented as a driver located at the user device or host. The splitter is positioned on a data path between the host (or VM) and volume that is to be protected by continuous data protection. The splitter may be referred to as a CDP driver. The splitter aggregates IOs, compresses the IOs, and sends the IOs to an object store (e.g., S3). A function is triggered and updates the metadata to a database.

More specifically, the splitter (or CDP driver) is responsible for intercepting writes to the volume (e.g., block device), augmenting multiple writes together, and generating, adding, or obtaining for each write metadata describing the write offset and size of the write. Once an amount of aggregated data 333 exceeds a threshold size the data is sent 336 to the object storage (e.g., S3 object store). A FaaS function of the CDP FaaS application is triggered 339 when an S3 object is inserted or created and updates a database table 327 where for each write the following entry will be written as shown in table A below.

TABLE A

| Write Time Stamp | Write Offset | Write Size | Object ID |
| --- | --- | --- | --- |
| time 1 | offset 1 | size 1 | ID 1 |
| time 2 | offset 2 | size 2 | ID 1 |
| time 3 | offset 3 | size 3 | ID 1 |
| time 4 | offset 4 | size 4 | ID 2 |
| time 5 | offset 5 | size 5 | ID 2 |
| time 6 | offset 6 | size 6 | ID 3 |
| . . . | . . . | . . . | . . . |

The write time stamp field stores the time and date of a write. The write offset field stores a block offset location of the write. The write size field stores a size or number of blocks of the write. The object ID field stores an object key or identifier of an object in which the write is stored. More particularly, as shown in the example of table A above, there are first, second, third, fourth, and fifth entries which correspond to first, second, third, fourth, and fifth IO writes, respectively. The first IO write was written to the volume at "time 1," at a write offset of "offset 1," having a size of "size 1," and has been stored in an object with an object ID of "ID 1" at the object store.

The second IO write was written to the volume at "time 2," at a write offset of "offset 2," having a size of "size 2," and has been stored in an object with an object ID of "ID 1" at the object store.

The third IO write was written to the volume at "time 3," at a write offset of "offset 3," having a size of "size 3," and has been stored in an object with an object ID of "ID 1" at the object store.

The fourth IO write was written to the volume at "time 4," at a write offset of "offset 4," having a size of "size 4," and has been stored in an object with an object ID of "ID 2" at the object store.

The fifth IO write was written to the volume at "time 5," at a write offset of "offset 5," having a size of "size 5," and has been stored in an object with an object ID of "ID 2" at the object store.

The sixth IO write was written to the volume at "time 6," at a write offset of "offset 6," having a size of "size 6," and has been stored in an object with an object ID of "ID 3" at the object store. And so forth.

In this example, the first, second, and third IO writes have been stored in the same object (i.e., "object ID 1"). The fourth and fifth IO writes have been stored in a different object (i.e., "object ID 2"). Depending upon sizes of the IO writes, a single object may store multiple IO writes (e.g., two or more IO writes) or a single IO write. A number of IO writes stored in an object may be different from or the same as a number of IO writes stored in another object. For example, the object identified as "object ID 1" is shown in table A as storing three IO writes (i.e., the first, second, and third IO writes). The object identified as "object ID 2" is shown in table A as storing two IO writes (i.e., the fourth and fifth IO writes). The database table may referred to as an IO metadata table.

Object storage refers to a storage model used to organize and manage units of storage, i.e., objects. An object includes the data content itself, metadata, and an object identifier or key. The data may include files, photos, videos, documents, and so forth. The metadata includes contextual information about the data. The object identifier is a globally unique identifier or address that is assigned to the object in order for the object to be found over a distributed system.

An advantage of object storage is that the metadata to be associated with an object is customizable and there is generally no limit on the type or amount of metadata that may be associated with the object. Another advantage of object storage is its scalability. There can be durability issues, hard limitations with the storage infrastructure, increased overhead and so forth when trying to expand block-based storage such as beyond a hundred terabytes or multiple petabytes. Object-based storage architectures, however, can generally be scaled out and managed simply by adding additional storage nodes. The flat name space organization of the data, in combination with its expandable metadata functionality, facilitate this ease of use. Object storage can also be much less expensive than block storage.

An advantage of block storage is that a file can be incrementally edited. With block storage, files are split into evenly sized blocks of data, each with its own address. In object storage, objects are generally manipulated as a whole unit in which the entire object is accessed, updated, and re-written, as required, in their entirety. This can have performance implications for data that is frequently written and accessed. Further, block storage can be accessed directly by an operating system as a mounted drive volume; whereas with object storage, there can be a degradation in performance as compared to block storage. Block storage is generally considered to be strongly consistent; whereas object storage is generally considered to be eventually consistent.

Figure 4:
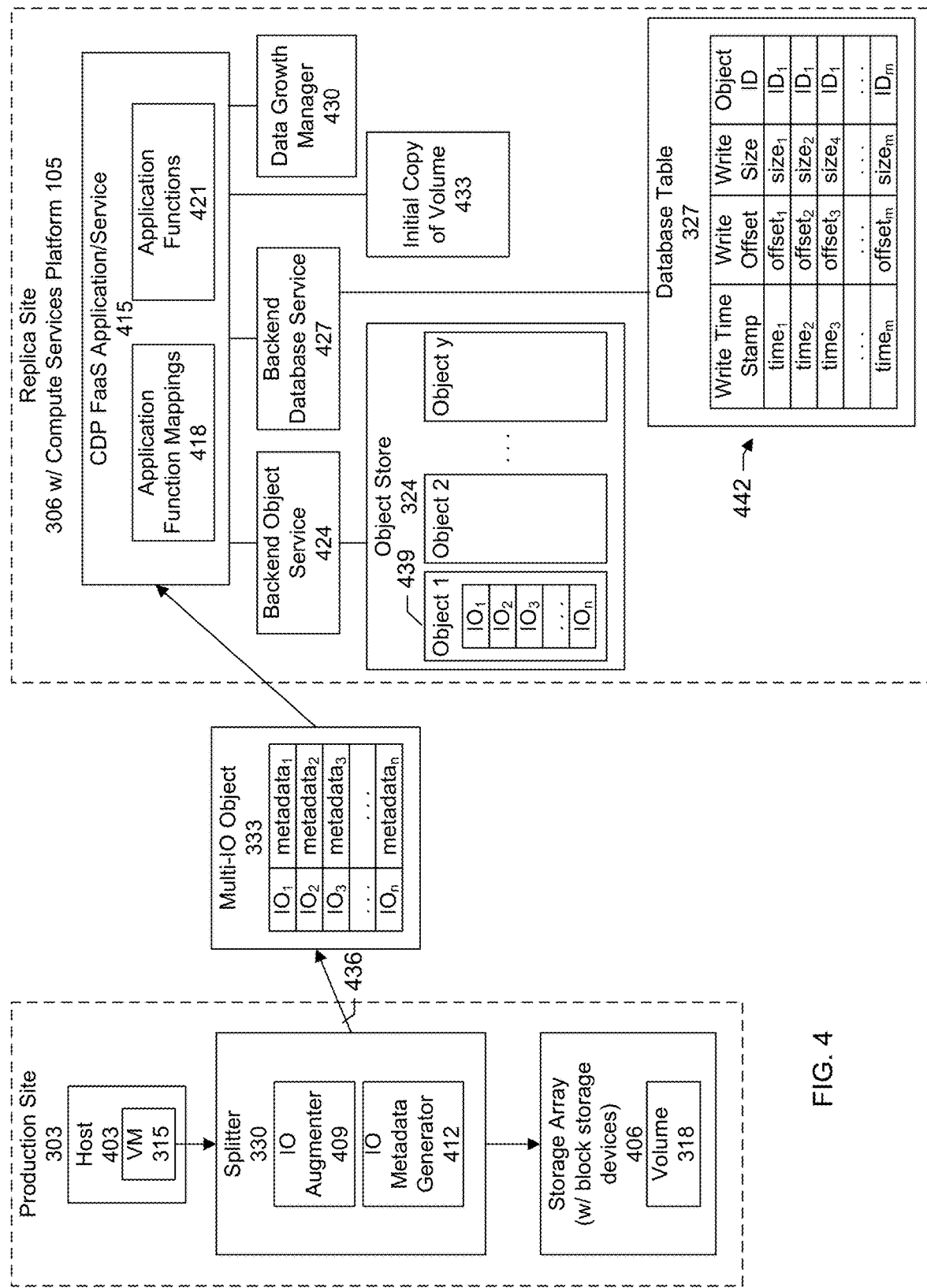
FIG. 4 shows a further detailed block diagram of a CDP FaaS-based system, according to one or more embodiments.

FIG. 4 shows further detail of the serverless continuous data protection system shown in FIG. 3. As shown in the example of FIG. 4, production site 303 includes a host 403 hosting virtual machine 315, a storage array 406 having volume 318, and splitter 330 positioned along a data path between the virtual machine and volume. The storage array may include any number of block storage devices (e.g., hard drives, solid state drives, and so forth) managed by the storage array. The splitter includes an IO augmenter 409 and an IO metadata generator 412.

Replica site 306 includes compute services platform 105 which executes a continuous data protection (CDP) FaaS application/service 415 having application function mappings 418 and application functions 421 interacting with backend services including a backend object service 424 and backend database service 427. The backend object service is responsible for creating and managing objects in object store 324. The backend database service is responsible for creating and managing entries of database 327.

The service may further include a data growth manager 430. The data growth manager is responsible for periodically removing, culling, or deleting old data according to a data retention policy. In an embodiment, the service further maintains an initial copy 433 of volume 318 from the production site. It should be appreciated that the components and modules shown in FIG. 4 may be functional and there can be many different hardware configurations.

The splitter is responsible for intercepting IO writes sent by the host (e.g., VM 315) to the volume. The splitter splits the IO so that the IO can be sent to both the production volume and replica site. However, prior to sending the IO to the replica site, the IO augmenter aggregates or collects a group of IO writes and also tracks a total size of the aggregated IO writes so that the aggregated IOs can be sent in batch. The IO metadata generator is responsible for generating or obtaining metadata for each IO write, the metadata including a write time stamp of an IO, write offset of the IO, and write size of the IO.

In an embodiment, the splitter compares the total size of a collection of aggregated IO writes to a threshold size. Once the collection of aggregated IO writes meets or exceeds the threshold size, the collection of aggregated IO writes and associated IO metadata is transmitted 436 from the production site to the CDP service at the replica site.

The backend object service receives the aggregated IO writes, creates an object (e.g., object 1 439) in which the aggregated IO writes are stored, and generates an object ID identifying the object in which the aggregated IO writes have been stored.

In an embodiment, once the object has been created in the object store (e.g., uploaded to a bucket of the object store), a FaaS application function is triggered via an application function mapping. The triggering, in turn, causes the backend database service to create a set of entries 442 in database 327 to store metadata for each of the aggregated IO writes. As discussed, an entry includes a write time stamp of an IO, write offset of the IO, write size of the IO, and object ID of the object in which the aggregated IO writes are stored.

Unlike traditional CDP systems, the CDP system shown in the example of FIG. 4 does not require the organization to maintain a server at the cloud compute services platform. For example, a server is not required to write to an AWS S3 bucket in an object store. Rather, an object interface is provided that allows for writing objects to the cloud compute services platform.

In an embodiment, the object store and database table are separate or different from each other. For example, the object store may store unstructured data whereas the database may store structured data. Structured data, in contrast to unstructured data, may generally be stored as columns and rows. The unstructured data stored in the objects may include, for example, documents, emails, video, audio, images, and so forth. The object store may be updated by a first backend service (e.g., object service) whereas the database may be updated by a second backend service (e.g., database service), different from the first database service. The database table may be updated after the object store has been updated (e.g., after an object has been created in the object store to store the aggregated IOs). The object store may store actual data content whereas the database may store metadata associated with the content.

Figure 5:
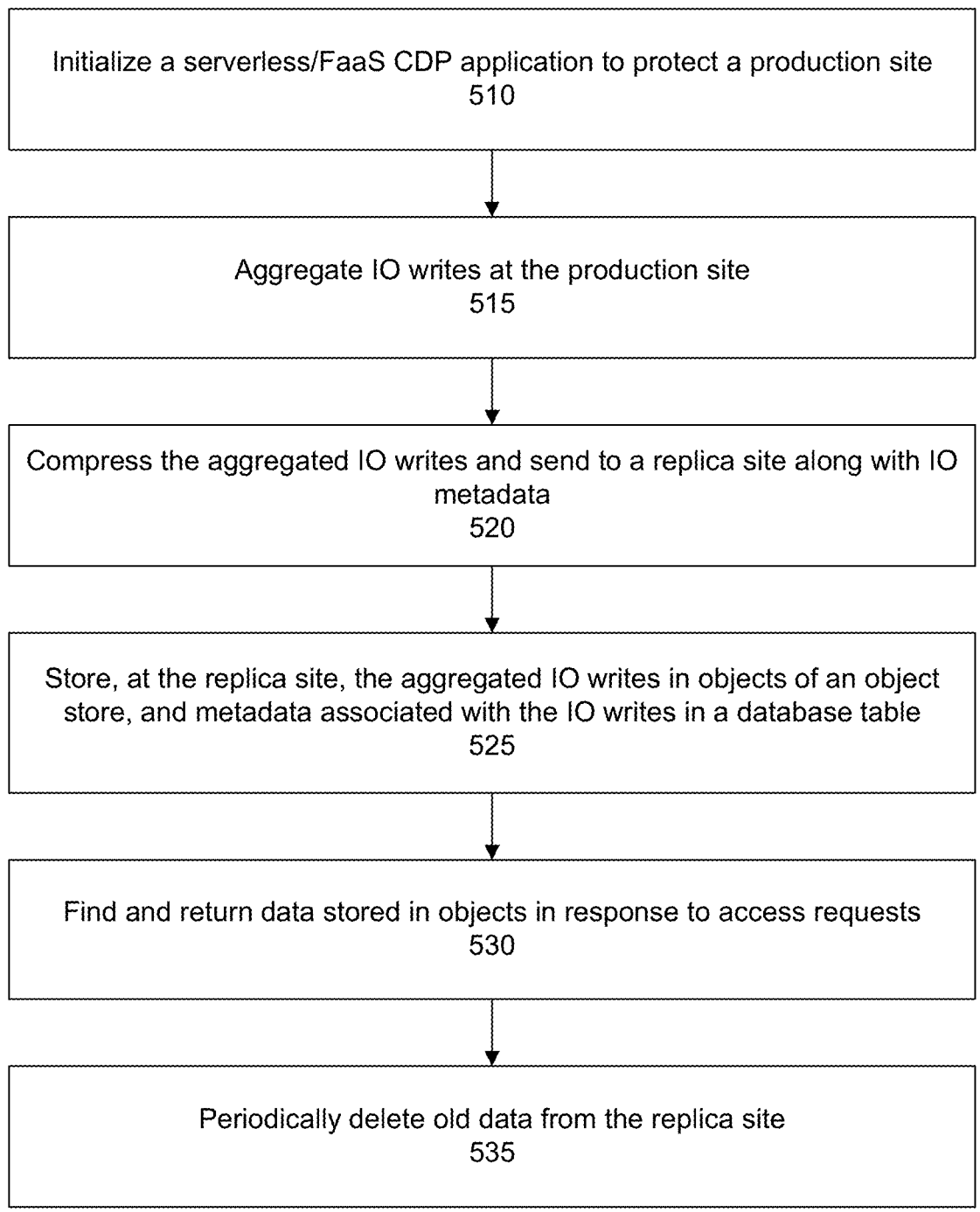
FIG. 5 shows an overall flow of a CDP FaaS-based system, according to one or more embodiments.

FIG. 5 shows an overall flow of operations of the serverless/FaaS continuous data protection system. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 510, serverless CDP between a production and replica site is initialized by intercepting IOs and providing the replica site with a current or initial copy of the volume. In other words, in a specific embodiment, in order to have a full images of the volume, the splitter may send all data from the volume, and thus once all of the volume has been sent to the cloud a full copy will exist. Initialization may include creating and sending a full copy of a volume to be protected to the replica site. Initialization may include creating and sending a snapshot of the volume to the replica site.

In a step 515, IO writes continue to be intercepted and are aggregated at the production site. In a step 520, the aggregated IO writes are compressed and sent to the replica site along with metadata for each IO. In a step 525, the aggregated IO writes are stored in an object of an object store at the replica site. Metadata associated with the IO writes is stored in a database table at the replica site. In a step 530, data stored in the objects is found and returned in response to access requests such as from a user device. In a step 535, old data (including metadata) is periodically culled from the object store and database. Further discussion is provided below.

Figure 6:
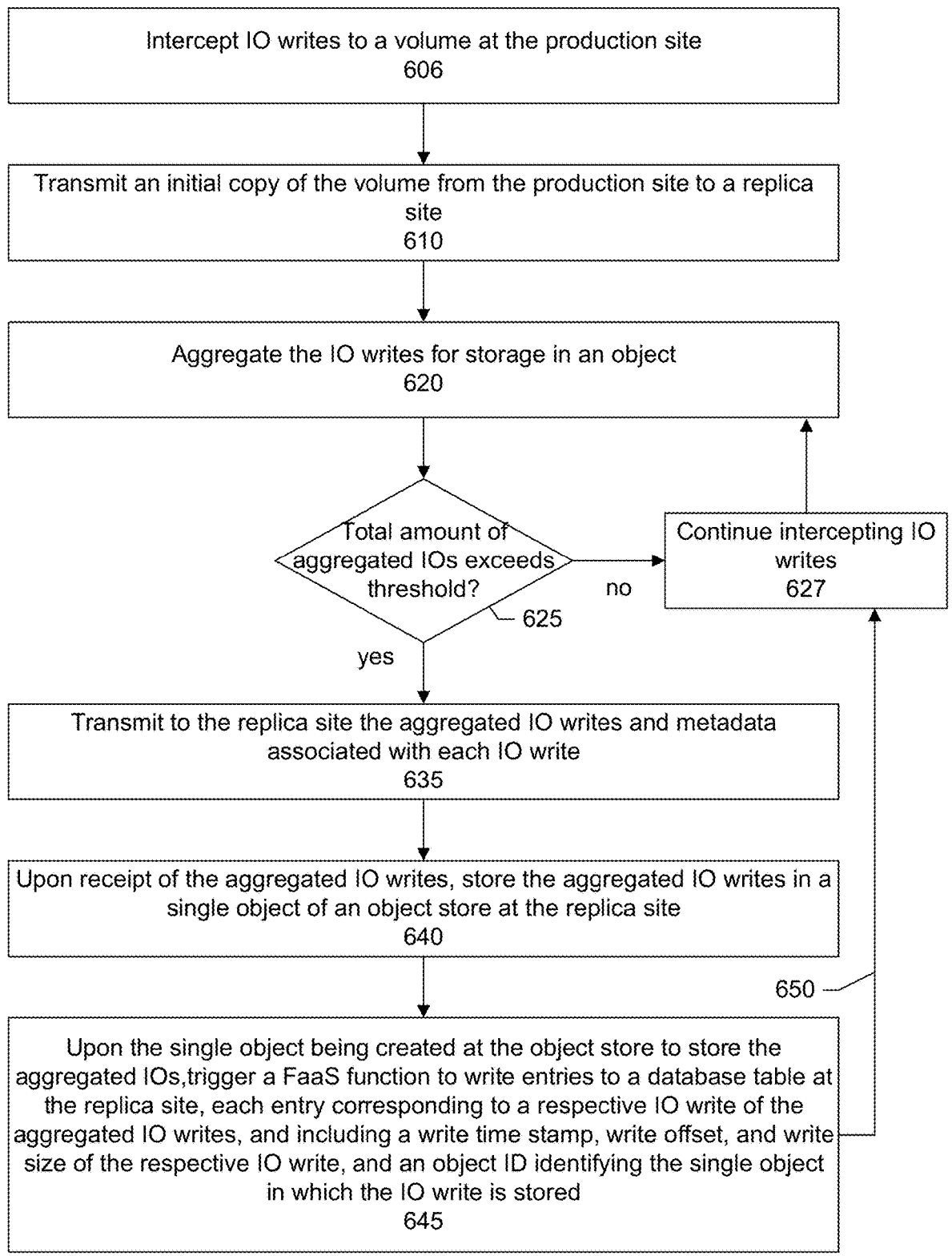
FIG. 6 shows a flow for storing IOs in objects of an object store for a CDP FaaS-based system, according to one or more embodiments.

FIG. 6 shows further detail of a flow for storing IOs in objects as part of the serverless CDP system. In a step 606, IO writes to a volume to be protected at a production site are intercepted. In a step 610, an initial or current copy of a volume to be protected is transmitted from the production site to a replica site. In a step 620, the IO writes are aggregated for storage in an object. That is, rather than sending each intercepted IO write to the replica site individually, the intercepted IO writes are aggregated or collected for sending in batch to the replica site.

In a step 625, a determination is made as to whether a total size of the aggregated IO writes exceeds a threshold size. If the total size does not exceed the threshold size, the process continues intercepting and aggregating IOs (steps 627 and 620). Alternatively, if the total size exceeds the threshold size, in a step 635, the aggregated IO writes and metadata associated with each IO write is transmitted from the production to replica site for storage. The metadata for each IO write may include a write time stamp indicating a time when the IO was written to the volume, a write offset of the IO, and a write size of the IO.

In a specific embodiment, the threshold size is about 4 megabytes (MB). The threshold size may range from about 1 MB to about 4 MB. The threshold size may be less than 1 MB or greater than 4 MB. The threshold size may be user-configurable.

In a step 640, upon receipt of the aggregated IO writes, the aggregated IO writes are stored in a single object of an object store.

In a step 645, upon the object being created at the object store to store the aggregated IO writes, a FaaS function is triggered to write entries to a database table maintained at the replica site. Each entry corresponds to a respective IO write of the aggregated IO writes and includes a write timestamp, write offset, and write size of the respective IO, and an object ID identifying the object in which the aggregated IO writes are stored. The object ID of the object may be generated when the object is created in the object store.

The process continues to repeat 650 as additional IOs sent to the volume are intercepted, aggregated, and transmitted to the replica site for storage in another object and the database table updated.

In an embodiment, steps 606 and 610 can be performed currently with each other. That is, the copy of the volume may be read and transmitted while changes (e.g., IO writes) are occurring. The process may begin intercepting IOs (and sending IOs for storage in an object); and a copy of the volume may be sent after IO interception has started. The time at which the reading of the volume begins is recorded and the IO writes are timestamped. This helps to ensure consistency, prevents the loss of IOs, allows production work to continue with little or no interruption or delay, and, more particularly, allows the IO writes to be properly ordered chronologically or with respect to the time at which they occur with the reading of the volume being the base start at which replication begins.

In some cases, costs charged by the cloud services provider may be based on the number of objects stored. Thus, storing multiple IOs in an object can be less expensive than storing each IO in a separate object. Further, as discussed, there can be latency when accessing objects. Storing each IO in separate objects can result in very high latency as many more objects may need to be accessed when retrieving data. Additionally, transmitting from a host individual IOs for storage as separate objects can result in very high overhead. As discussed above, the threshold size for an aggregated IO batch (and thus object size) may range from about 1 MB to about 4 MB. Depending upon the size of an IO, some objects may store a large number of small IOs (e.g., 2,000 or more IOs). Other objects may store a small number of large IOs (e.g., 500 or fewer IOs).

Figure 7:
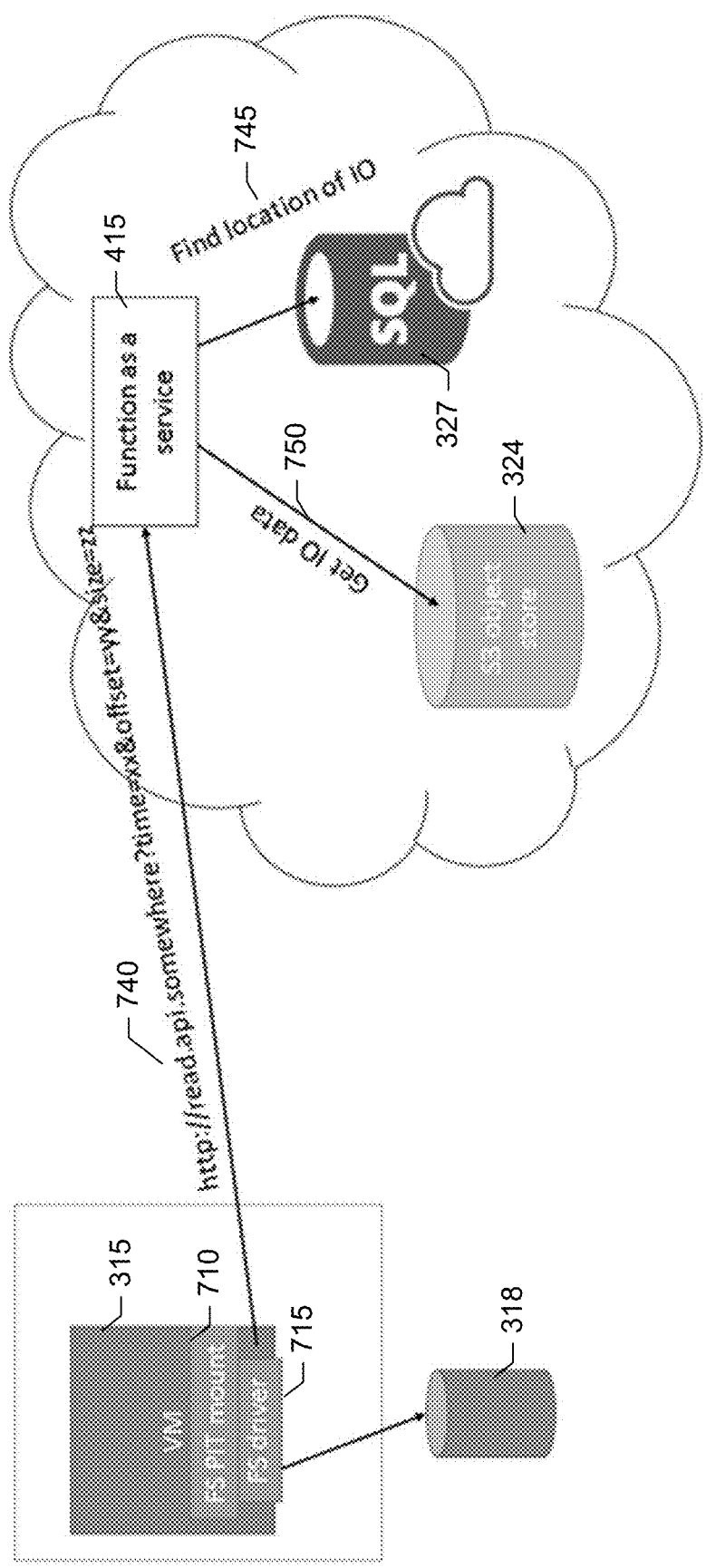
FIG. 7 shows a block diagram of a read request in a CDP FaaS-based system, according to one or more embodiments.

FIG. 7 shows a block diagram of mounting a file system at a point in time in order to access the protected volume and recover a specific file. In an embodiment, the technique provides for FaaS based accessed to any point in time in a volume. As shown in the example of FIG. 7, the production site includes production VM 315, volume 318, file system (FS) point in time mount 710, and file system (FS) driver 715. A replica site includes CDP FaaS application 415, object storage 324, and database 327.

A request 740 (e.g., http request) to read and access protected data is transmitted from the production site to the replica site. The request may include a point in time to recover, an offset, and size. The CDP FaaS application processes the request, queries 745 the database to find object IDs of objects storing the relevant IOs, gets 750 the IO data from the identified objects, reads the objects to obtain the IO data, and returns the data responsive to the request.

In an embodiment, the FS driver allows for reading data directly from the cloud compute platform via an API (e.g., REpresentational State Transfer (REST) API). The API can be used to pass read request parameters including a volume ID of a volume the user wishes to read, offset, size, and point in time to be accessed. Upon receipt of the read request, a function is called to process the request and return the desired data that was last written as of the particular point in time to the API call.

Specifically, in order to recover a file from a specific time in the CDP system, the volume protected at that specific point in time needs to be accessed. The data of point in time T on offset X, is the last write that was written to offset X before time T (if there were no writes then the original data sent during the initialization process is provided as there were no changes).

To identify which object holds the data a SQL query can be used to find an IO where the start offset<=X the start offset+size>=x, the time start<T and the maximal one is from all of those writes is identified. Once the write is found, the system reads the corresponding object from the object store and returns the data responsive to the read request to the user. In a specific embodiment, recovery of data is implemented as a function as a service which is triggered by a URL. The URL parameters include the time stamp of the read, the offset, and size of the read. These parameters are received by the FaaS application and the FaaS application returns the data stored.

A drive may be created that allows a mount of the file system as a read-only file system remotely where the block data will be read using the FAAS function as shown in FIG. 7 and described above. A mount file system command may be added that sets a specific time for all the reads and redirects all the reads as an http request. The file system may be adjusted to allow for relatively long response times. The CDP FaaS system allows for very fast recovery to single files and mounting the file system in multiple point in time to search for the correct version of a file that the user wishes to recover. Further, in an embodiment, the organization does not need to maintain a running server at the replica site to access the protected data.

Though the read may be relatively slow, an expectation is that a typical use case is a single file recover. Thus, the speed of the read will be sufficient. Further, as discussed, the CDP system has very flexible scalability. Specifically, multiple reads can be performed in parallel, concurrently, or simultaneously with other reads as there can be multiple application function instances processing in parallel. Consider, as an example, that a situation involves reading 10,000 IOs. While the latency of each IO may be relatively high, the IOs can be read in parallel. The system provides a very high degree of parallelism. Further, multiple (e.g., two or more) different IO metadata database tables can be maintained for the same volume to be protected. This helps to keep each IO metadata table relatively small and can improve database performance as compared to maintaining a single large IO metadata table. (see, e.g., FIGS. 19-20 and accompanying discussion).

Figure 8:
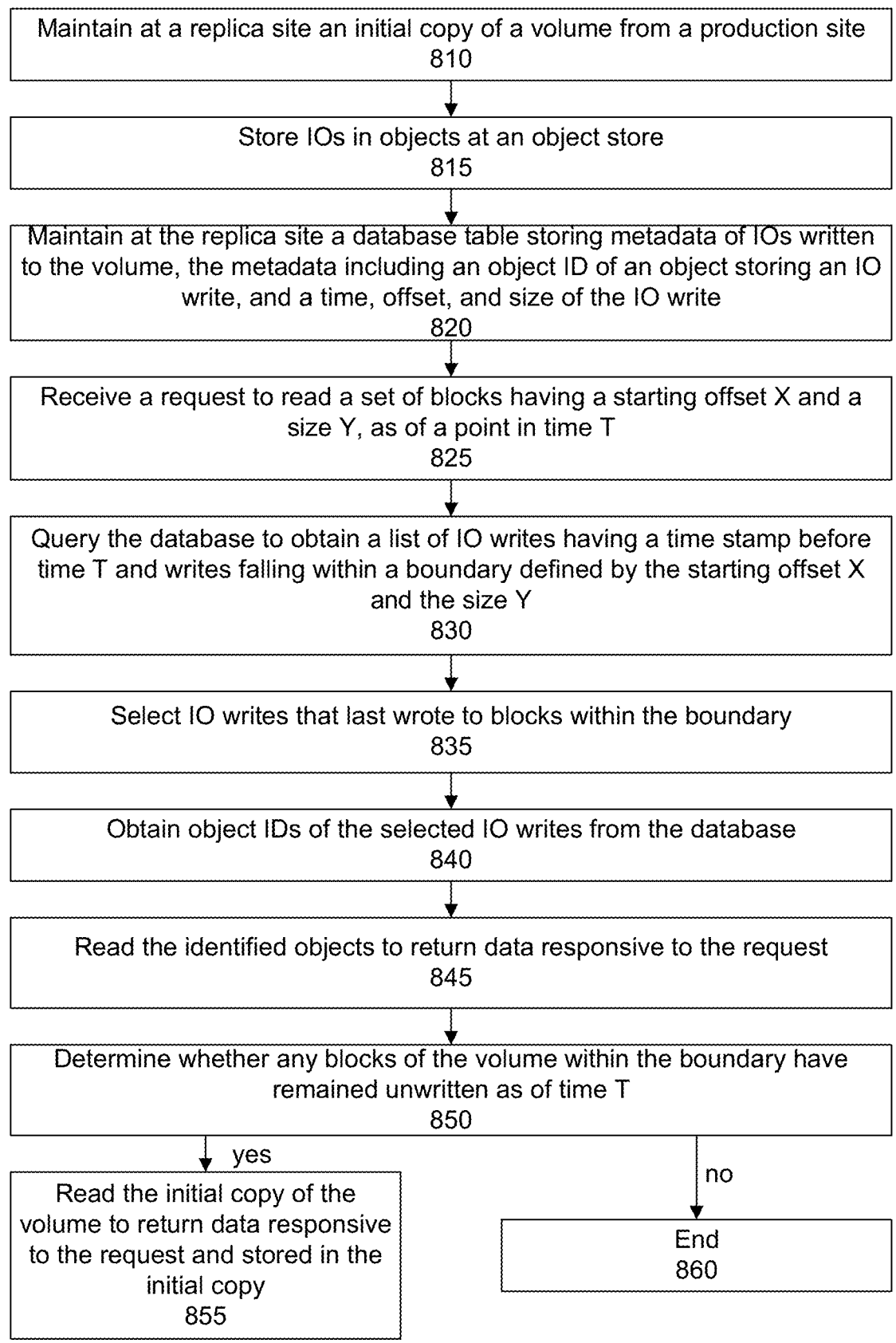
FIG. 8 shows a flow diagram for processing a read request, according to one or more embodiments.

FIG. 8 shows further detail of a flow for recovering a file from a protected volume as of a particular point in time. The technique allows for recreating a view of the volume at a particular point in time. In an embodiment, the technique involves examining various particular offsets of interest and identifying a last time immediately before the particular point in time that a write was made. If there was no write (e.g., no write time stamps), the initial copy of the volume can be read as a determination is made that no changes were made.

In a step 810, an initial copy of a volume from a production site is transmitted to a replica site and maintained at the replica site.

For example, FIG. 9 shows a block layout 905 of an initial copy of a volume as of a time T0 (e.g., 12:30 pm). The layout includes blocks 1-25.

Referring back now to FIG. 8, in a step 815, IO writes sent to the volume at the production site are transmitted to the replica site and stored in objects of an object store at the replica site. In a step 820, a database is maintained at the replica site, where the database stores metadata of IOs written to the volume. The metadata includes an object ID of an object storing an IO write, and a write time stamp, write offset, and write size of the IO write. Further details of storing IOs in objects via the CDP FaaS application are provided in the flow FIG. 6, for example, and described in the discussion accompanying FIG. 6.

As an example, FIG. 10, shows the block layout of FIG. 9 as of a time T1 (e.g., 1:00 pm) after time T0 where a first IO has been sent to the volume that includes writes to blocks 9-13. These writes are shown using a fill pattern of vertical lines.

Figure 15:
FIG. 15 shows an example of a database table storing IO metadata, according to one or more embodiments.

FIG. 15 shows an example of a database table 1505 storing IO metadata including a write time, write offset, and write size of an IO and an object ID of an object storing the IO. Specifically, the first IO has been transmitted to the replica site for storage in an object and a first entry 1520 (FIG. 15) is created in the database table that corresponds to the first IO. The first entry includes the corresponding write time (e.g., 1:00 pm) of the first IO, address identifying the blocks written to (e.g., offset 8, size 5), and object ID (e.g., B) of the object storing the first IO.

FIG. 11 shows the block layout as of a time T2 (e.g., 1:05 pm) after time T1 where a second IO has been sent to the volume that includes writes to blocks 15-17. These writes are shown using a fill pattern of horizontal lines. The second IO has been transmitted to the replica site for storage in an object and a second entry 1525 (FIG. 15) is created in the database table that corresponds to the second IO. The second entry includes the corresponding write time (e.g., 1:05 pm) of the second IO, address identifying the blocks written to (e.g., offset 14, size 3), and object ID (e.g., B) of the object storing the second IO. In this example, the first and second IOs were aggregated at the production site and transmitted together for storage in object B.

FIG. 12 shows the block layout as of a time T3 (e.g., 1:07 pm) after time T2 where a third IO has been sent to the volume that includes writes to blocks 6-12. These writes are shown using a fill pattern of diagonal lines. The third IO has been transmitted to the replica site for storage in an object and a third entry 1530 (FIG. 15) is created in the database table that corresponds to the third IO. The third entry includes the corresponding write time (e.g., 1:07 pm) of the third IO, address identifying the blocks written to (e.g., offset 5, size 7), and object ID (e.g., C) of the object storing the third IO.

FIG. 13 shows the block layout as of a time T4 (e.g., 1:09 pm) after time T3 where a fourth IO has been sent to the volume that includes writes to blocks 12-15. These writes are shown using a fill pattern of cross-hatched lines. The fourth IO has been transmitted to the replica site for storage in an object and a fourth entry 1535 (FIG. 15) is created in the database table that corresponds to the fourth IO. The fourth entry includes the corresponding write time (e.g., 1:09 pm) of the fourth IO, address identifying the blocks written to (e.g., offset 11, size 4), and object ID (e.g., D) of the object storing the fourth IO.

FIG. 14 shows the block layout as of a time T5 (e.g., 1:15 pm) after time T4 where a fifth IO has been sent to the volume that includes writes to blocks 21-23. These writes are shown using a fill pattern of grid lines. The fifth IO has been transmitted to the replica site for storage in an object and a fifth entry 1540 (FIG. 15) is created in the database table that corresponds to the fifth IO. The fifth entry includes the corresponding write time (e.g., 1:15 pm) of the fifth IO, address identifying the blocks written to (e.g., offset 20, size 3), and object ID (e.g., E) of the object storing the fifth IO. (For purpose of example, all IOs shown in FIGS. 9-15 are assumed to have occurred on the same day).

Referring back now to FIG. 8, in a step 825, the FaaS application at the replica site receives a request to read a set of blocks having a starting offset X and a size Y as of a point in time T.

In a step 830, the database table is queried to obtain a list of IO writes having a time stamp before time T and falling within a boundary defined by the starting offset X and the size Y.

In a step 835, IO writes that last wrote to blocks within the boundary are selected from the list of IO writes.

In a step 840, object IDs of the selected IO writes are obtained by cross-referencing the database table with the selected IO writes. These object IDs thus identify objects storing data of the selected IO writes.

In a step 845, after the relevant IOs have been determined from searching and examining the database table, the object store is accessed and the identified objects are read to obtain the data associated with the selected IO writes and return the data in response to the read request.

In a step 850, a determination is made as to whether any blocks of the volume within the boundary have remained unwritten as of time T. In a step 855, if a block within the volume has remained unwritten as of time T, the initial copy of the volume is read (as there would be no IOs received to store in an object) and the data from the volume is returned in response to the request. Alternatively, if all blocks within the boundary have changed as of point in time T, the relevant IOs would have been stored in one or more objects and the initial copy of the volume is not accessed (step 860).

Referring now to FIGS. 9-15, consider, as an example, that the request is to access blocks of the volume at an address given as offset IO, size 9, and a point in time given as 2:00 pm. In this example, a boundary for a read is thus defined as including blocks 11-19. The database table is queried to find a list of relevant IOs (e.g., IOs to blocks falling within the defined boundary and occurring before 2:00 pm). In this example, the IO list thus includes the first, second, third, and fourth IOs because these IOs occurred before 2:00 pm and include writes to blocks falling within the defined boundary. The fifth IO is excluded from the IO list because the fifth IO did not include any blocks falling within the defined boundary.

The IO list is then reviewed to select or identify those IOs that last wrote to blocks falling within the defined boundary. Specifically, for block 11, the third IO is identified. The entry in the database table storing the metadata for the third IO (e.g., third entry 1530) is then cross-referenced to identify the object storing the third IO (e.g., object C). The object store is then accessed to read and obtain the third IO data from the identified object (e.g., object C).

For blocks 12-15, the fourth IO is identified. The entry in the database table storing the metadata for the fourth IO (e.g., fourth entry 1535) is then cross-referenced to identify the object storing the fourth IO (e.g., object D). The object store is then accessed to read and obtain the fourth IO data from the identified object (e.g., object D).

For blocks 16-17, the second IO is identified. The entry in the database table storing metadata for the second IO (e.g., second entry 1525) is then cross-referenced to identify the object storing the second IO (e.g., object B). The object store is then accessed to read and obtain the second IO data from the identified object (e.g., object B).

For blocks 18-19, there have been no IOs as of the point in time of 2:00 pm. Thus, for blocks 18-19, the initial copy of the volume sent to the replica site is read to obtain the data stored in blocks 18-19.

FIG. 16 shows an example of the blocks with corresponding fill patterns for which the data would be returned in response to the request.

Figure 17:
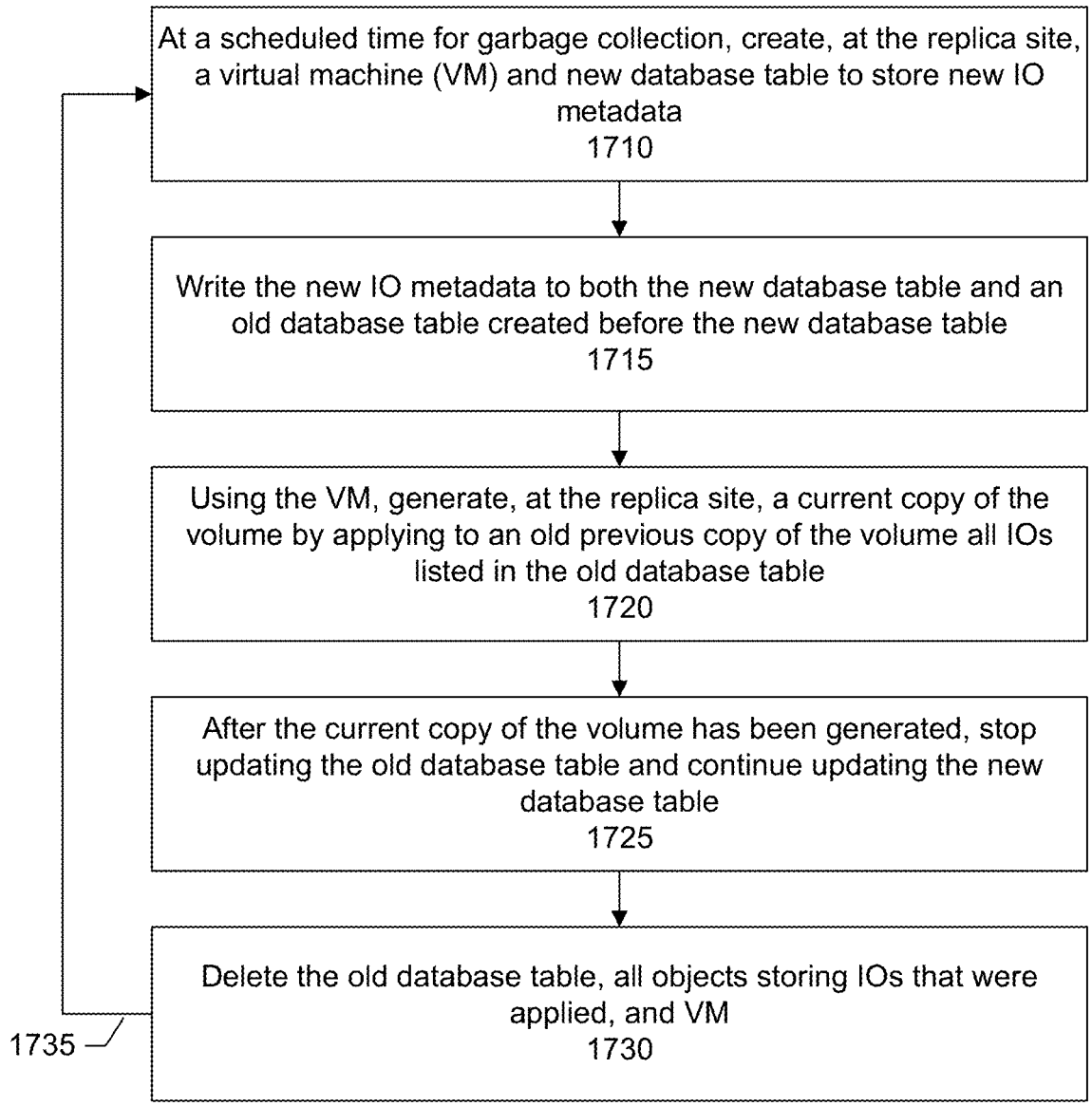
FIG. 17 shows a flow for managing data growth, according to one or more embodiments.

FIG. 17 shows a flow for addressing data growth at the replica site. As time progresses, IOs will continue to be made at the production site and thus transmitted to the replica site. Thus, the data and tables at the replica site will continue to grow. In order to manage the growth, older or aged data may be deleted while newer or more recent data is kept. In an embodiment, there can be a set of user-defined data retention and recovery policies that specify, among other things, limits on the earliest point in time for which data may be recovered, recoveries to any points in time over a specified past or elapsed time period, recoveries to only specific points in time over a specified past or elapsed time period, and so forth. For example, depending upon the needs of an organization, the organization may set a policy that provides recoveries to any point in time over a last 24-hour period, recoveries to specific points in time over a last two week period, and so forth.

In a specific embodiment, a garbage collection mechanism is created to delete older or aged data while maintaining newer or more recent data. In this specific embodiment, the garbage collection runs in the cloud at the replica site and includes a virtual machine that runs periodically. The VM is created for the process and is disposed after.

In this specific embodiment, the VM creates a copy of the volume at the latest point in time the collection started and keeps it as a set of objects. The IO metadata will be updated to a new second database table. Once the garbage collection process starts, an update is made to the FaaS function to write the changes into the new second database table as well as the old first database table. Once the rebuild finishes, the FAAS function is directed to update only the second database table. The system can now delete the old database table and all the objects created before the period of time the collection started while continuing to have CDP. The collection process may be configured to occur, for example, once every month and the data for each VM can be kept for 12 months. As a result, there can be several full copies of the VM, but the databases will be very small. The collection VM can be deleted once the process completes.

More particularly, in a step 1710, at a scheduled time for garbage collection, a virtual machine and new database table to store new IO metadata is created at the replica site. The VM may be referred to as a collection VM. In a step 1715, new IO metadata for IOs arriving at the replica site is written to both the new database table and an old database table created before the new database table. In a step 1720, the collection VM generates, at the replica site, a current copy of the production volume by applying to an old previous copy of the volume all IOs listed in the old database table.

In a step 1725, after the current copy of the volume has been generated, the FaaS function is directed to stop updating the old database table and continue updating the new database table. In a step 1730, the old database table, all objects storing IOs that were applied, and the virtual machine are deleted. The process can then loop back 1735 to repeat periodically.

Thus, in an embodiment, the garbage collection mechanism is run periodically rather than continuously. This can help to reduce the amount of time and cost that the collection VM is active. That is, the VM is run only for the period of time required to perform the garbage collection and consolidation work. Afterwards, the VM may be deleted.

For example, garbage collection may be configured to run every month or at any other frequency as desired. Consider, as an example, that the system is configured to consolidate data on a rolling two week period. In this example, every two weeks, the CDP FaaS application may be instructed to begin writing new IO metadata (associated with newly arriving IOs) to a new database table. To consolidate, the old IOs listed in the old database table are then applied to the volume. In other words, an object may be contained in a volume (e.g., base volume) and all the changes that have been replicated from the production to replica site are applied to the volume. Once the volume has been updated, the database table along with the objects whose IOs have been applied to the volume can be deleted. In other words, CDP replication is effectively restarted every two weeks (or at any other frequency as desired). After two weeks has elapsed, the older data can be deleted.

In a specific embodiment, a method for managing data growth at a replica site includes periodically creating a new database table for new metadata associated with new IOs; consolidating, in conjunction or together with the periodically creating a new database table, old IOs into a volume image; and deleting an old database table storing old metadata associated with the old IOs, old objects in which the old IOs are stored, or both.

For example, in a specific embodiment, a user-configurable schedule may be stored indicating the time or frequency at which garbage collection or consolidation is to occur. Upon a determination that a time for garbage collection has arrived, a new database table to store metadata associated with new IOs is created at the replica site. The new IOs may include IOs that have yet to arrive at the replica site. The creation of the new database table may be accompanied by the consolidation of old IOs into a volume image. The volume image may be maintained at the replica site. The old IOs may include IOs previously received at the replica site and having timestamps before the time for garbage collection has arrived. These old IOs may be stored in old objects at the object store at the replica site. Metadata associated with the old IOs may be stored in a separate (old) database table. The old database table is accessed to identify the old objects storing the old IOs (e.g., read the table for IOs with timestamps before the present or current time for garbage collection). Upon the old objects being identified, the old objects may be read to obtain the old IOs stored in the old objects. The old IOs are then applied in order to generate the volume image. After the volume image is generated, the old objects storing the old IOs, old database table storing metadata associated with the old IOs, or both may be deleted from the replica site.

Figure 18:
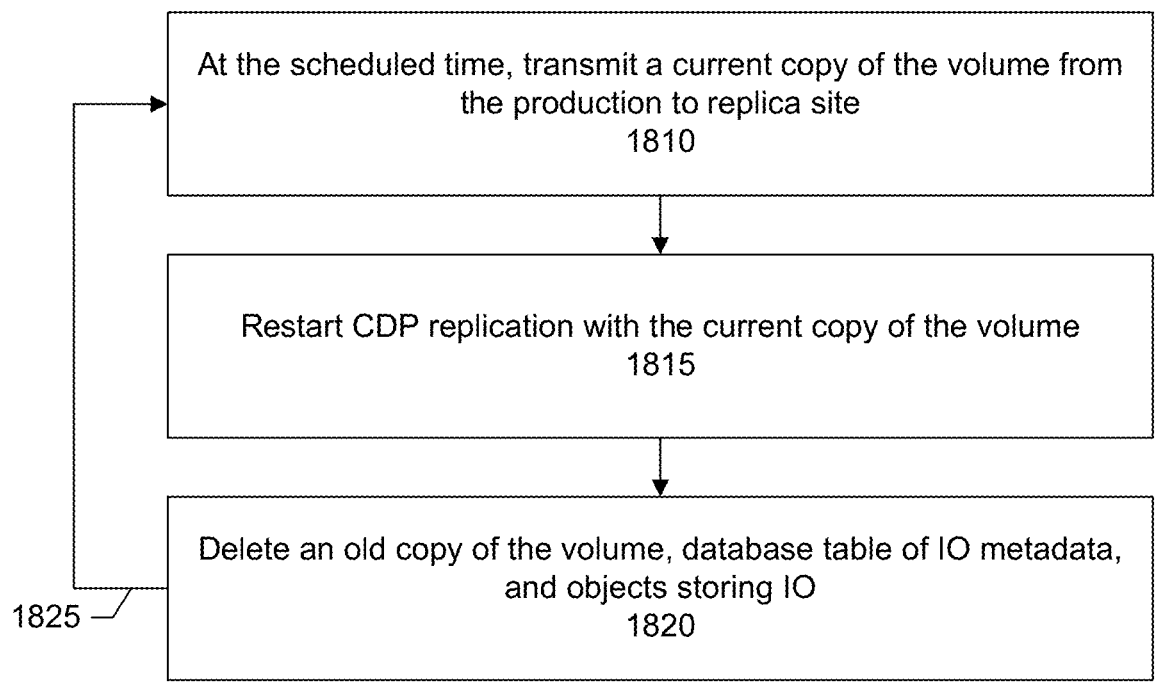
FIG. 18 shows another flow for managing data growth, according to one or more embodiments.

FIG. 18 shows a flow for addressing data growth according to another specific embodiment. The flow shown in FIG. 18 is similar to the flow shown in FIG. 17 and described in the discussion accompanying FIG. 17. In this specific embodiment, however, garbage collection is performed without having to run a collection VM in the cloud. In this specific embodiment, a full copy of the production VM or volume is periodically sent from the production site to the cloud replica site. For example, a full copy may be sent every month or at any other frequency as desired.

Depending upon the organization's needs and requirements, in some cases, there can be two or more copies of the volume (corresponding to different points in time) maintained at the replica site along with various sets of IOs or changes received after those particular points in time. For example, there can be a first copy of a volume that corresponds to a first point in time, a second copy of the volume that corresponds to a second point in time after the first point in time, a first set of IOs (e.g., changes) received after the first point in time and before the second point in time, and a second set of IOs received after the second point in time. A recovery to the first point in time can be performed using the first copy of the volume. A recovery to any point in time between the first and second points in time can be performed using the first copy of the volume and applying changes from the first set of IOs. A recovery to the second point in time can be performed using the second copy of the volume. A recovery to any point in time between the second point in time and a current point in time can be performed using the second copy of the volume and applying changes from the second set of IOs.

In other cases, there can be a single copy of the volume corresponding to a particular point in time (along with a set of IOs or changes received after that particular point in time). Thus, an oldest recovery may be to that particular point in time or any other time between that particular point in time and a current time.

More particularly, in a step 1810, at the scheduled time, a current copy of the volume is transmitted from the production to the replica site. In a step 1815, CDP replication is restarted with the current copy of the volume as described in the discussion above and accompanying FIG. 17. In a step 1820, an old copy of the volume, database table of IO metadata, and objects storing IO, or combinations of these may be deleted. The process can then loop back 1825 to repeat periodically.

As compared to the other technique shown in FIG. 17, periodically transmitting a full copy to the replica site may require more bandwidth than the technique shown in FIG. 17 and there may be duplicate data that is sent. The technique shown in FIG. 18, however, does not require running a VM in the cloud and may also require less code complexity. Factors in determining which data growth management technique to apply may include the expected size of the full copy of data that may need to be periodically transmitted from the production to replica site, cost charged by the cloud services provider to run a VM, amount of bandwidth available, and so forth. These factors can be used to determine which process is more efficient.

In another specific embodiment, there can be an option to store all data (e.g., all changes) indefinitely. For example, if the production VM is not very active, the organization may decide to not run any garbage collection mechanism and instead maintain all data indefinitely.

Figure 19:
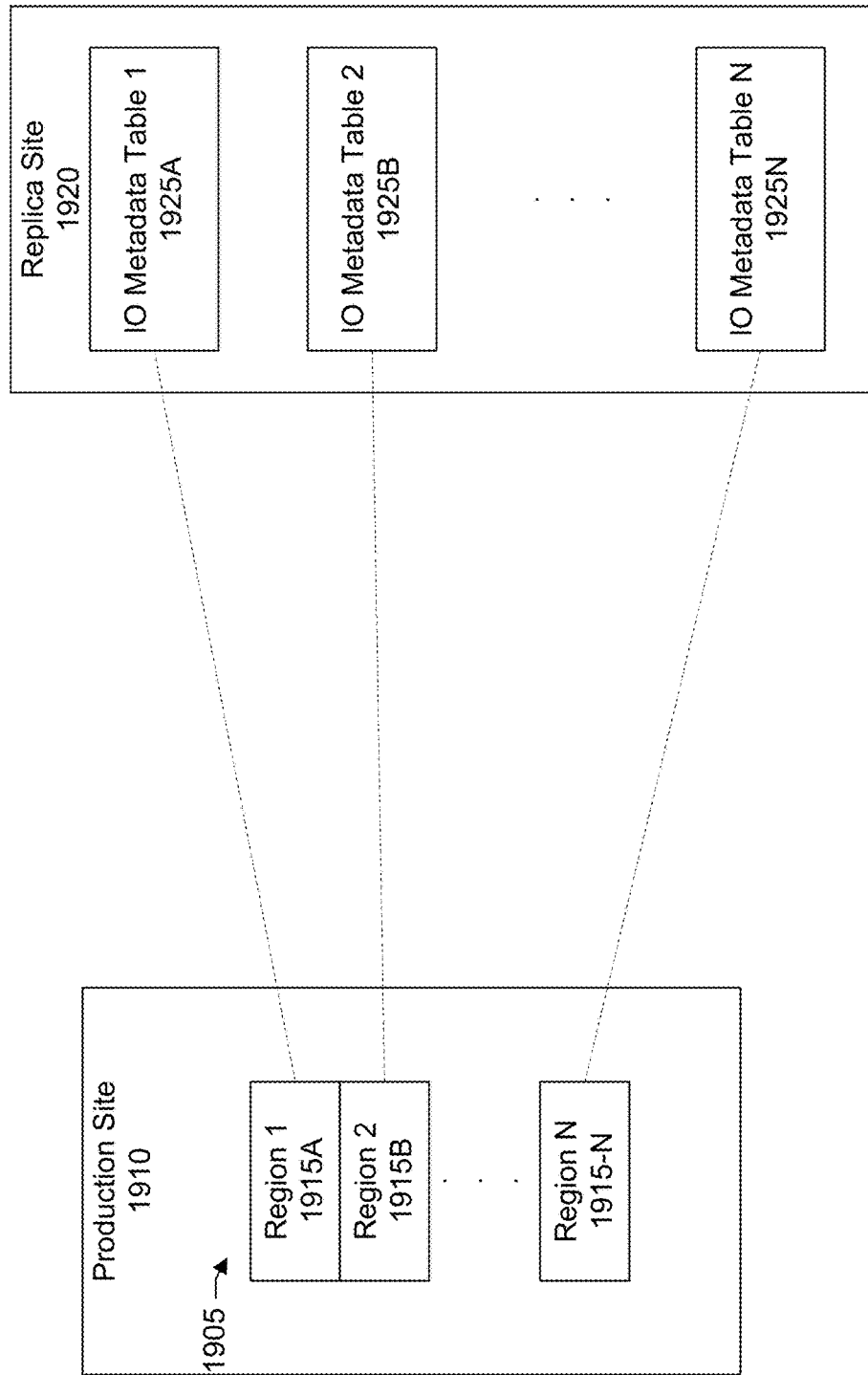
FIG. 19 shows a block diagram for managing a size of an IO metadata table, according to one or more embodiments.

FIG. 19 shows a block diagram illustrating a technique for managing the growth of the IO metadata tables. Over time, an IO metadata table can get rather large, especially if a volume happens to be very active in which numerous IOs are sent. In order to reduce a size or number of entries in an IO metadata table, there can be a separate table maintained for different regions of the volume. A write that crosses regions can be kept as two separate writes. This can help to limit the size of the database tables and improve performance.

As shown in the example of FIG. 19, a volume 1905 at a production site 1910 has been divided into a set of regions including a first region 1915A, a second region 2 1915B, and so forth. A replica site 1920 includes a set of IO metadata tables including a first database table 1925A, a second database table 1925B, and so forth. The first database table is associated with or assigned to the first region. The first database table stores IO metadata of IOs written to the first region of the volume. The second database table is associated with or assigned to the second region. The second database table stores IO metadata of IOs written to the second region of the volume.

Figure 20:
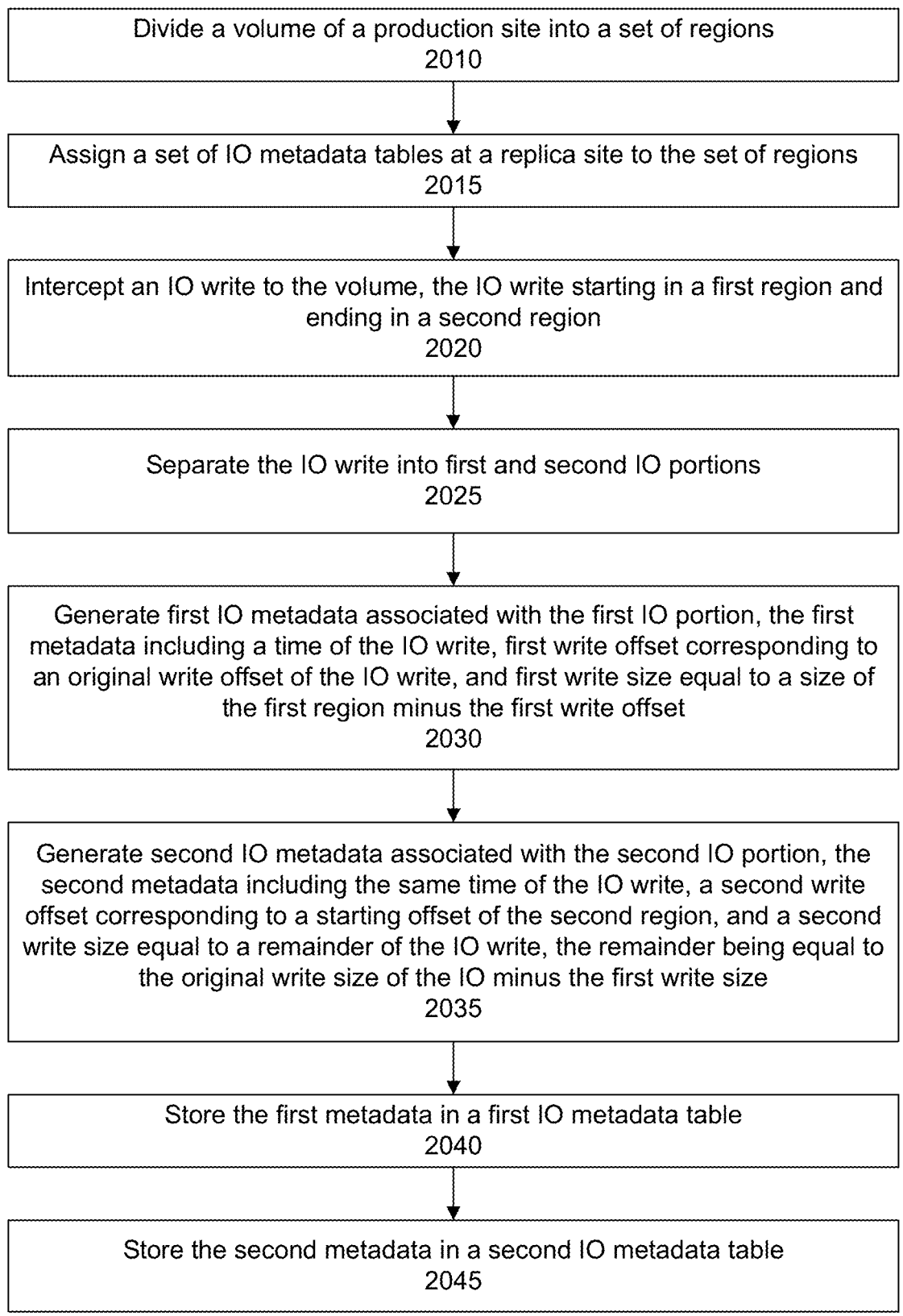
FIG. 20 shows a flow for managing the size of an IO metadata table, according to one or more embodiments.

FIG. 20 shows an example of flow for separating a write that crosses regions as shown in the example of FIG. 19. In a step 2010, a production volume is divided into a set of regions. In a step 2015, a set of database tables are created at the replica site and assigned to the set of regions. Each region is associated with a respective database table.

In a step 2020, an IO write to the volume is intercepted where the IO write starts in a first region of the volume and ends in a second region of the volume. In a step 2025, the IO write is split into a first IO portion and a second IO portion.

In a step 2030, first IO metadata associated with the first IO portion is generated. The first IO metadata includes a write time stamp of the IO write, a first write offset, and a first write size. The first write offset corresponds to or equals an original write offset of the IO write. The first write size corresponds to or equals a size of the first region minus the first write offset.

In a step 2035, second IO metadata associated with the second IO portion is generated. The second IO metadata includes the same write time stamp of the IO write, a second write offset, and a second write size. The second write offset corresponds to or equals a starting or beginning offset of the second region. The second write size corresponds to or equals a remainder of the IO write, the remainder being equal to an original write size of the IO minus the first write size.

In a step 2040, the first IO metadata is stored in a first database table. In a step 2045, the second IO metadata is stored in a second database table, different from the first database table.

Consider, as an example, that the first and second regions of the volume are each sized at 100 blocks, an IO write starts in the first region at an offset of block 98 and has a size of 4. Thus, the IO write ends in the second region at block 102.

The IO write is separated into first and second IO portions. As shown in step 2030, first IO metadata for the first IO portion is generated and includes a first write offset and first write size. The first write offset may be calculated by setting the first write offset equal to an original offset of the original IO write. In this example, the first write offset is thus equal to 98. The first write size may be calculated by subtracting the first write offset from the size of the first region. Thus, the first write size is 2 (100−98=2).

As shown in step 2035, second IO metadata for the second IO portion is generated and includes a second write offset and second write size. The second write offset is set to a starting offset of the second region. Thus, in this example, the second write offset equals 100. The second write size equals a remainder of the original IO write. The remainder may be calculated by subtracting the first write size from the original write size. Thus, in this example, the second write size equals 2 (4−2=2).

In other words, the first write offset is the original write offset of the original write and the first write size is equal to the size of the first region minus the first write offset. The second write offset corresponds to a beginning or starting offset of the second region and the second write size will be the remainder or what is left of the original write size.

In a specific embodiment, a region may be sized to be about 10 gigabytes (GB). However, the number of regions into which a volume is divided may vary depending upon factors such as the size of the volume, expected volume activity, and other factors. A large volume with high levels of activity may have a greater number of regions as compared to a smaller sized volume with lower levels of activity.

The systems and techniques described herein enable the data of a production site protected under CDP to be directly saved to object storage, which is much less expensive as compared to other storage systems. Further, the user may pay only for the amount of IO operations he or she creates. For example, in many cases, a cloud compute service provider charges based on a number of times a function is triggered. Thus, if there is relatively little activity or traffic, the organization pays a relatively small amount. Nonetheless, the CDP system and techniques described herein are massively scalable. For example, if there happens to be heavy activity or traffic, many millions of instances an application function may be created. The system has much more flexible scaling as compared to traditional CDP approaches.

Moreover, in cases involving a VM, the VM is not constantly active. Thus, costs are primary storage as compared to compute. In an embodiment, the data may be kept compressed or maintained in a compressed format at the replica site to further reduce storage requirements.

The systems and techniques described herein enable restoring files from any point in time in a relatively cost-effective manner without any or very little compute on the cloud. In order to ensure security, all the data can be maintained in an encrypted format in the cloud, and only the mounting of the file system locally will decrypt the data. This may require the get operation to return a complex structure and not just the data required, as it will not know to separate single blocks from an encrypted IO.

Full rebuilds of the volume for requested points in time may be performed in the cloud for purposes such as disaster recovery.

The following includes a further discussion of some disadvantages with prior approaches to CDP that may be addressed by the serverless CDP systems and techniques described herein. Creating snapshot based copies in an object store requires high resource usage in the production site. Traditional CDP systems require block storage at replica site. That is, there is a full copy of the data at the replica site, in a block format, which results in very high costs. Traditional CDP systems require VMs running full-time on the cloud site to accept and process IOs as well as expensive block storage. More particularly, traditional CDP systems require compute attached to the block volume at the replica site. Compute in the cloud is expensive. Indeed, having a running VM for data protection can cost more than the storage. Traditional CDP systems typically require snapshots to allow faster cloud access to old points in time and snapshot storage is significantly more expensive.

Resources are not used efficiently as restore use cases are rare and do not always require full fail over. In other words, single file restore use cases are much more common. Running VMs and holding primary data and snapshots can be very expensive. In many cases, virtual machines in an organization have relatively low activity, and a small amount of change rate. Thus, the amount of storage required for CDP can be small since activity is relatively sparse. However, the required the infrastructure, block storage and required VMs can be very expensive. As a result, the cost of using CDP for such machine is prohibitive. That is, traditional CDP solutions require running a virtual machine with all the data in order to restore a single file. These payments can be expensive, regardless of the size of file restored. Snap-based replication solutions require snapshots on the productions system. Snapshot of VMs can be expensive, and snap-based replication does not necessarily provide the required granularity.

In an embodiment, a compute services platform includes one or more storage systems configured to store FaaS applications and other information relating to FaaS applications, backend services, and other system functionality.

Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of a compute services platform in an illustrative embodiment include VNX® and Symmetrix VMAX® storage arrays, flash hybrid storage products such as Unity™ software-defined storage products such as ScaleIO™ and ViPR®, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

The term "processing platform" as used herein is intended to be broadly construed so as to encompass, by way of illustration and without limitation, multiple sets of processing devices and one or more associated storage systems that are configured to communicate over one or more networks.

As a more particular example, a FaaS application or service can be implemented in the form of one or more LXCs running on one or more VMs. Other arrangements of one or more processing devices of a processing platform can be used to implement the FaaS application as well as other components of the compute services platform. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the compute services platform 105 to reside in different data centers. Numerous other distributed implementations of the compute services platform 105 are possible.

Accordingly, the FaaS application manager, CDP FaaS application, or both can each be implemented in a distributed manner so as to comprise a plurality of distributed components implemented on respective ones of the plurality of compute nodes of the compute services platform 105.

Although illustratively shown as being implemented within the compute services platform 105, components such as the FaaS application manager and CDP FaaS application in other embodiments can be implemented at least in part externally to the compute services platform 105. For example, such components can each be implemented at least in part within another system element or at least in part utilizing one or more stand-alone components coupled to the network 104.

It is to be appreciated that these and other features of illustrative embodiments are presented by way of example only, and should not be construed as limiting in any way.

Accordingly, different numbers, types and arrangements of system components such as FaaS application manager and CDP FaaS application can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments functionality for CDP can be offered to cloud infrastructure customers or other users as part of a PaaS offering.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the compute services platform 105 or portions thereof are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as AWS S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 21, 22, and 23. Although described in the context of system 100, these platforms may also be used to implement at least portions of other information processing systems in other embodiments.

Figure 21:
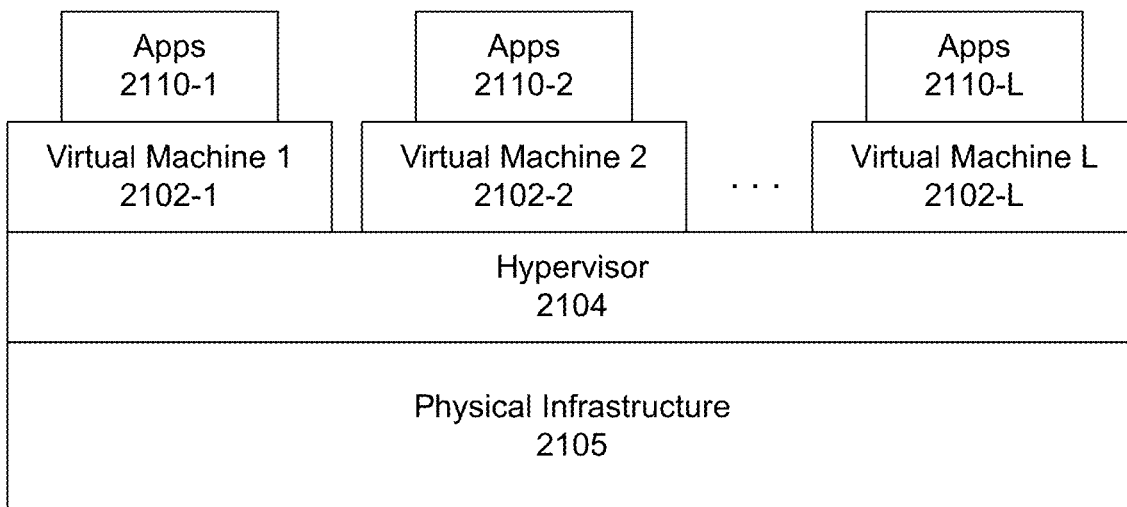
FIG. 21 shows a block diagram of a processing platform that may be utilized to implement at least a portion of an information processing system, according to one or more embodiments.
Figure 22:
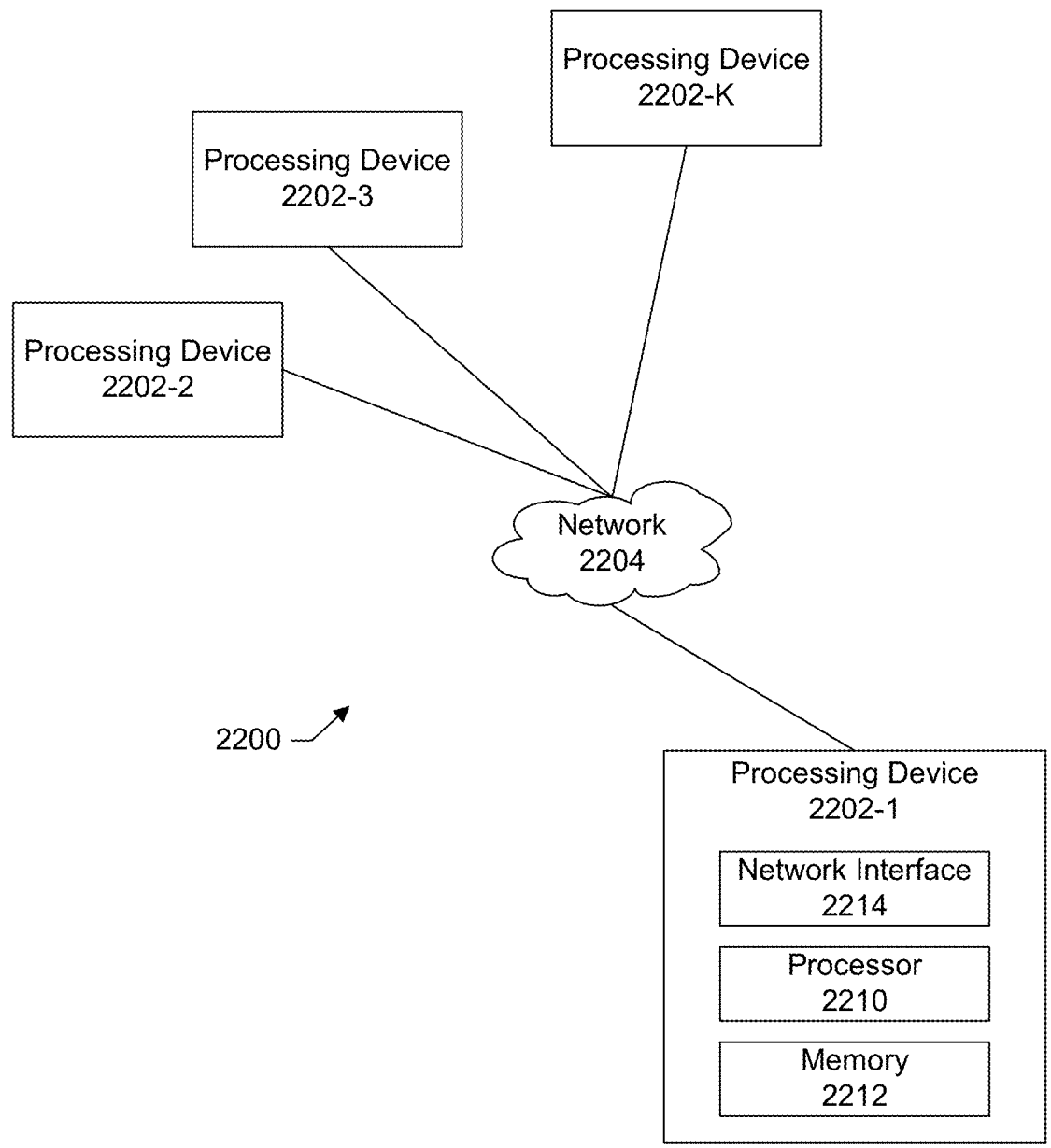
FIG. 22 shows another block diagram of a processing platform that may be utilized to implement at least a portion of an information processing system, according to one or more embodiments.

FIG. 21 shows an example processing platform comprising cloud infrastructure 2100. The cloud infrastructure 2100 comprises a combination of physical and virtual processing resources that may be utilized to implement at least a portion of the information processing system 100. The cloud infrastructure 2100 comprises virtual machines (VMs) 2102-1, 2102-2, . . . 2102-L implemented using a hypervisor 2104. The hypervisor 2104 runs on physical infrastructure 2105. The cloud infrastructure 2100 further comprises sets of applications 2110-1, 2110-2, . . . 2110-L running on respective ones of the virtual machines 2102-1, 2102-2, . . . 2102-L under the control of the hypervisor 2104.

Although only a single hypervisor 2104 is shown in the embodiment of FIG. 21, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 2104 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 2100 shown in FIG. 21 may represent at least a portion of one processing platform. Another example of such a processing platform is processing platform 2200 shown in FIG. 22.

The processing platform 2200 in this embodiment comprises a portion of system 100 and includes a plurality of processing devices, denoted 2202-1, 2202-2, 2202-3, . . . 2202-K, which communicate with one another over a network 2204.

The network 2204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2202-1 in the processing platform 2200 comprises a processor 2210 coupled to a memory 2212.

The processor 2210 may comprise a microprocessor, a microcontroller, an application-specific integrated circuit (ASIC), a field-programmable gate array (FPGA) or other type of processing circuitry, as well as portions or combinations of such circuitry elements.

The memory 2212 may comprise random access memory (RAM), read-only memory (ROM) or other types of memory, in any combination. The memory 2212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2202-1 is network interface circuitry 2214, which is used to interface the processing device with the network 2204 and other system components, and may comprise conventional transceivers.

The other processing devices 2202 of the processing platform 2200 are assumed to be configured in a manner similar to that shown for processing device 2202-1 in the figure.

Again, the particular processing platform 2200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 105 are illustratively implemented in the form of software running on one or more processing devices.

Figure 23:
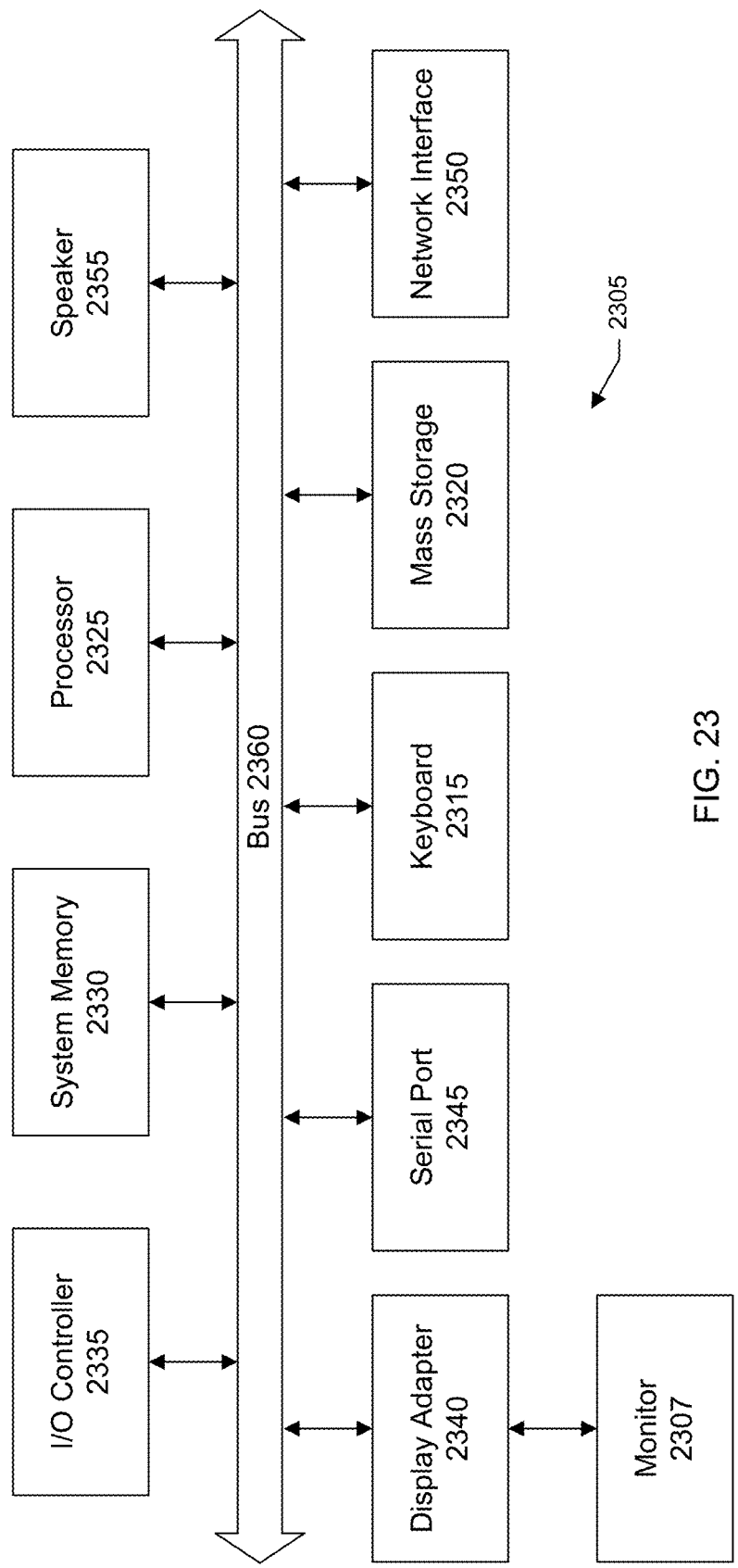
FIG. 23 shows a block diagram of a computer system suitable for use with the system, according to one or more embodiments.

FIG. 23 shows a system block diagram of a computer system 2305 used to execute the software of the present system described herein. The computer system includes a monitor 2307, keyboard 2315, and mass storage devices 2320. Computer system 2305 further includes subsystems such as central processor 2325, system memory 2330, input/output (I/O) controller 2335, display adapter 2340, serial or universal serial bus (USB) port 2345, network interface 2350, and speaker 2355. The system may also be used with computer systems with additional or fewer subsystems. For example, a computer system could include more than one processor 2325 (i.e., a multiprocessor system) or a system may include a cache memory.

Arrows such as 2360 represent the system bus architecture of computer system 2305. However, these arrows are illustrative of any interconnection scheme serving to link the subsystems. For example, speaker 2355 could be connected to the other subsystems through a port or have an internal direct connection to central processor 2325. The processor may include multiple processors or a multicore processor, which may permit parallel processing of information. Computer system 2305 shown in FIG. 23 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, a method includes: intercepting a plurality of input/output (IOs) written to a volume of a block storage device at a production site; aggregating, at the production site, the plurality of IOs for storage in an object at a replica site, remote from the production site; and transmitting, from the production site to the replica site, the aggregated plurality of IOs and metadata associated with each IO, the metadata for each IO comprising a write timestamp indicating when an IO was written, a write offset of the IO, and a write size of the IO, wherein the aggregated plurality of IOs are stored in a single object maintained in an object storage at the replica site, and wherein upon the single object being stored in the object storage, a function is triggered that writes entries to a database table maintained at the replica site, each entry corresponding to a respective IO of the aggregated plurality of IOs, and comprising a write timestamp, write offset, and write size of the respective IO, and an object identifier (ID) of the single object in which the aggregated plurality of IOs are stored.

The method may include tracking a total size of the plurality of IOs that have been aggregated; and performing the transmitting when the total size exceeds a predetermined threshold size. The method may include transmitting a copy of the volume to the replica site.

In an embodiment, the database table is a first database table and the method includes: dividing the volume into a plurality of regions; associating a first region with the first database table; associating a second region with a second database table; intercepting a first IO written to the volume, the first IO starting in the first region and ending in the second region; separating the first IO into an IO first portion and an IO second portion; generating first metadata associated with the IO first portion; and generating second metadata associated with the IO second portion, wherein the first metadata is stored in the first database table and comprises a first write timestamp indicating when the first IO was written, a first write offset corresponding to an original write offset of the first IO, and a first write size equal to a size of the first region minus the first write offset, and wherein the second metadata is stored in the second database table and comprises the same first write timestamp, a second write offset starting at a beginning offset of the second region, and a second write size equal to a remainder of the first IO, the remainder being equal to an original write size of the first IO minus the first write size.

The method may include managing data growth at the replica site by periodically deleting old objects from the object storage and corresponding IO metadata stored in the database table. In a specific embodiment, the method includes managing data growth at the replica site by: periodically creating a new database table for new metadata associated with new IOs; consolidating, in conjunction with the periodically creating a new database table, old IOs into a volume image; and deleting an old database table storing old metadata associated with the old IOs, and old objects in which the old IOs are stored.

The method may include: maintaining, at the replica site, an initial copy of the volume; receiving, at the replica site, a request to read a set of blocks as of a time T and having a starting offset X and a size Y; querying the database table to obtain a list of IOs having write timestamps before the time T and writes falling within a boundary defined by the starting offset X and the size Y; selecting, from the list of IOs, IOs that last wrote to blocks within the boundary; using the selected IOs, cross-referencing corresponding object IDs listed in the database table, the object IDs identifying objects storing writes of the selected IOs; reading the identified objects to return first data responsive to the request and stored in the identified objects, the first data comprising data that changed as of the time T; and reading the initial snapshot copy of the volume to return second data responsive to the request and stored in the initial copy of the volume, the second data comprising data that remained unchanged as of the time T.

In another specific embodiment, there is a system comprising: a processor; and memory configured to store one or more sequences of instructions which, when executed by the processor, cause the processor to carry out the steps of: intercepting a plurality of input/output (IOs) written to a volume of a block storage device at a production site; aggregating, at the production site, the plurality of IOs for storage in an object at a replica site, remote from the production site; and transmitting, from the production site to the replica site, the aggregated plurality of IOs and metadata associated with each IO, the metadata for each IO comprising a write timestamp indicating when an IO was written, a write offset of the IO, and a write size of the IO, wherein the aggregated plurality of IOs are stored in a single object maintained in an object storage at the replica site, and wherein upon the single object being stored in the object storage, a function is triggered that writes entries to a database table maintained at the replica site, each entry corresponding to a respective IO of the aggregated plurality of IOs, and comprising a write timestamp, write offset, and write size of the respective IO, and an object identifier (ID) of the single object in which the aggregated plurality of IOs are stored.

In another specific embodiment, there is a computer program product, comprising a non-transitory computer-readable medium having a computer-readable program code embodied therein, the computer-readable program code adapted to be executed by one or more processors to implement a method comprising: intercepting a plurality of input/output (IOs) written to a volume of a block storage device at a production site; aggregating, at the production site, the plurality of IOs for storage in an object at a replica site, remote from the production site; and transmitting, from the production site to the replica site, the aggregated plurality of IOs and metadata associated with each IO, the metadata for each IO comprising a write timestamp indicating when an IO was written, a write offset of the IO, and a write size of the IO, wherein the aggregated plurality of IOs are stored in a single object maintained in an object storage at the replica site, and wherein upon the single object being stored in the object storage, a function is triggered that writes entries to a database table maintained at the replica site, each entry corresponding to a respective IO of the aggregated plurality of IOs, and comprising a write timestamp, write offset, and write size of the respective IO, and an object identifier (ID) of the single object in which the aggregated plurality of IOs are stored.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
   providing a serverless application to a cloud site of a cloud services provider, the cloud services provider offering backend services comprising an object store and a database;
   intercepting a plurality of input/output (IOs) written to a volume of a block storage device at a production site, remote from the cloud site;
   aggregating, at the production site, the plurality of IOs for storage in an object at the object store of the cloud services provider;
   transmitting, from the production site to the cloud site, the aggregated plurality of IOs and metadata associated with each IO, the metadata for each IO comprising a write timestamp indicating when an IO was written, a write offset of the IO, and a write size of the IO,
   wherein upon receipt of the aggregated IOs and metadata at the cloud site, the aggregated IOs are stored in a single object in the object store at the cloud site, and a function of the serverless application is triggered that writes the metadata to the database offered by the cloud services provider;
   maintaining, at the cloud site, a first database storing metadata associated with IOs written to a first region of the volume;
   maintaining, at the cloud site, a second database storing metadata associated with IOs written to a second region of the volume; and
   upon an IO being written to the volume that crosses the first and second regions, storing metadata associated with the IO in the first database and the second database.

2. The method of claim 1 wherein the object store comprises an S3 object interface.

3. The method of claim 1 wherein the object store is provided as a first backend service by the cloud services provider, and the database is provided as a second backend service, different from the first backend service, by the cloud services provider.

4. The method of claim 1 wherein upon the single object being stored in the object store at the cloud site an object identifier (ID) is generated for the single object, and the method further comprises:
   writing, in the database, the metadata for each IO and the object ID of the single object in which the IO was stored.

5. The method of claim 1 further comprising periodically running, at the cloud site, a garbage collection comprising:
   creating, at the cloud site, a virtual machine and a new database;
   receiving, at the cloud site, new metadata associated with a new aggregated plurality of IOs;
   writing the new metadata to the new database and the database, the database now being an old database;
   generating, by the virtual machine, a copy of the volume by applying IOs listed in the old database to a previous copy of the volume; and
   after the copy of the volume has been generated, stopping writing of the new metadata to the old database, and deleting the old database, objects from the object store identified in the old database, and the virtual machine.

6. A system comprising: a processor; and memory configured to store one or more sequences of instructions which, when executed by the processor, cause the processor to carry out the steps of:
   providing a serverless application to a cloud site of a cloud services provider, the cloud services provider offering backend services comprising an object store and a database;
   intercepting a plurality of input/output (IOs) written to a volume of a block storage device at a production site, remote from the cloud site;
   aggregating, at the production site, the plurality of IOs for storage in an object at the object store of the cloud services provider;
   transmitting, from the production site to the cloud site, the aggregated plurality of IOs and metadata associated with each IO, the metadata for each IO comprising a write timestamp indicating when an IO was written, a write offset of the IO, and a write size of the IO,
   wherein upon receipt of the aggregated IOs and metadata at the cloud site, the aggregated IOs are stored in a single object in the object store at the cloud site, and a function of the serverless application is triggered that writes the metadata to the database offered by the cloud services provider;
   periodically running, at the cloud site, a garbage collection comprising:
   creating, at the cloud site, a virtual machine and a new database;
   receiving, at the cloud site, new metadata associated with a new aggregated plurality of IOs;

writing the new metadata to the new database and the database, the database now being an old database;

generating, by the virtual machine, a copy of the volume by applying IOs listed in the old database to a previous copy of the volume; and after the copy of the volume has been generated, stopping writing of the new metadata to the old database, and deleting the old database, objects from the object store identified in the old database, and the virtual machine.

7. The system of claim 6 wherein the object store comprises an S3 object interface.

8. The system of claim 6 wherein the object store is provided as a first backend service by the cloud services provider, and the database is provided as a second backend service, different from the first backend service, by the cloud services provider.

9. The system of claim 6 wherein upon the single object being stored in the object store at the cloud site an object identifier (ID) is generated for the single object, and the processor further carries out the steps of:

writing, in the database, the metadata for each IO and the object ID of the single object in which the IO was stored.

10. The system of claim 6 wherein the processor further carries out the steps of:

maintaining, at the cloud site, a first database storing metadata associated with IOs written to a first region of the volume;

maintaining, at the cloud site, a second database storing metadata associated with IOs written to a second region of the volume; and upon an IO being written to the volume that crosses the first and second regions, storing metadata associated with the IO in the first database and the second database.

11. A computer program product, comprising a non-transitory computer-readable medium having a computer-readable program code embodied therein, the computer-readable program code adapted to be executed by one or more processors to implement a method comprising:

providing a serverless application to a cloud site of a cloud services provider, the cloud services provider offering backend services comprising an object store and a database;

intercepting a plurality of input/output (IOs) written to a volume of a block storage device at a production site, remote from the cloud site;

aggregating, at the production site, the plurality of IOs for storage in an object at the object store of the cloud services provider;

transmitting, from the production site to the cloud site, the aggregated plurality of IOs and metadata associated with each IO, the metadata for each IO comprising a write timestamp indicating when an IO was written, a write offset of the IO, and a write size of the IO, wherein upon receipt of the aggregated IOs and metadata at the cloud site, the aggregated IOs are stored in a single object in the object store at the cloud site, and a function of the serverless application is triggered that writes the metadata to the database offered by the cloud services provider;

maintaining, at the cloud site, a first database storing metadata associated with IOs written to a first region of the volume;

maintaining, at the cloud site, a second database storing metadata associated with IOs written to a second region of the volume; and upon an IO being written to the volume that crosses the first and second regions, storing metadata associated with the IO in the first database and the second database.

12. The computer program product of claim 11 wherein the object store comprises an S3 object interface.

13. The computer program product of claim 11 wherein the object store is provided as a first backend service by the cloud services provider, and the database is provided as a second backend service, different from the first backend service, by the cloud services provider.

14. The computer program product of claim 11 wherein upon the single object being stored in the object store at the cloud site an object identifier (ID) is generated for the single object, and the method further comprises:

writing, in the database, the metadata for each IO and the object ID of the single object in which the IO was stored.

15. The computer program product of claim 11 wherein the method further comprises periodically running, at the cloud site, a garbage collection comprising:

creating, at the cloud site, a virtual machine and a new database;

receiving, at the cloud site, new metadata associated with a new aggregated plurality of IOs;

writing the new metadata to the new database and the database, the database now being an old database;

generating, by the virtual machine, a copy of the volume by applying IOs listed in the old database to a previous copy of the volume; and after the copy of the volume has been generated, stopping writing of the new metadata to the old database, and deleting the old database, objects from the object store identified in the old database, and the virtual machine.

* * * * *